US012769033B2

(12) United States Patent
Shiono et al.

(10) Patent No.: US 12,769,033 B2
(45) Date of Patent: Oct. 20, 2026

(54) OPTICAL FILTER

(71) Applicant: AGC Inc., Tokyo (JP)

(72) Inventors: Kazuhiko Shiono, Fukushima (JP); Motoshi Nakayama, Tokyo (JP); Takashi Nagata, Shizuoka (JP)

(73) Assignee: AGC Inc., Tokyo (JP)

( * ) Notice: Subject to any disclaimer, the term of this patent is extended or adjusted under 35 U.S.C. 154(b) by 289 days.

(21) Appl. No.: 18/751,442

(22) Filed: Jun. 24, 2024

(65) Prior Publication Data

US 2024/0345291 A1 Oct. 17, 2024

Related U.S. Application Data

(63) Continuation of application No. PCT/JP2022/047247, filed on Dec. 21, 2022.

(30) Foreign Application Priority Data

Dec. 27, 2021 (JP) ................................ 2021-212958

(51) Int. Cl.

*G02B 1/115* (2015.01)
*G02B 1/14* (2015.01)
*G02B 5/22* (2006.01)
*G02B 5/28* (2006.01)

(52) U.S. Cl.

CPC ................ *G02B 1/115* (2013.01); *G02B 1/14* (2015.01); *G02B 5/223* (2013.01); *G02B 5/287* (2013.01)

(58) Field of Classification Search

None

See application file for complete search history.

(56) References Cited

U.S. PATENT DOCUMENTS

| | | | | |
|---|---|---|---|---|
| 11,163,098 | B2 * | 11/2021 | Nagaya | G01J 1/0488 |
| 11,585,968 | B2 * | 2/2023 | Kubo | G03B 11/043 |
| 2016/0170105 | A1 | 6/2016 | Nagaya et al. | |

FOREIGN PATENT DOCUMENTS

| | | | |
|---|---|---|---|
| JP | 2016-200771 | A | 12/2016 |
| JP | 2019-124946 | A | 7/2019 |
| JP | 2021-6901 | A | 1/2021 |
| WO | WO 2015/056734 | A1 | 4/2015 |

* cited by examiner

*Primary Examiner* — Jyotsna V Dabbi

(74) *Attorney, Agent, or Firm* — Oblon, McClelland, Maier & Neustadt, L.L.P.

(57) ABSTRACT

An optical filter includes: a substrate; and a dielectric multilayer film (A) laid on or above at least one main surface of the substrate as an outermost layer, the dielectric multilayer film (A) being configured to reflect a light in a wavelength region of 900 nm or more, in which the substrate includes a resin film including a resin and a dye (I) having a maximum absorption wavelength of 700 nm to 800 nm in the resin, the optical filter transmits a visible light and a light in at least a partial wavelength region of 750 nm to 1000 nm, and the optical filter satisfies all of spectral characteristics (i-1) to (i-9).

12 Claims, 7 Drawing Sheets

OPTICAL FILTER

CROSS-REFERENCE TO RELATED APPLICATIONS

This is a bypass continuation of International Patent Application No. PCT/JP2022/047247, filed on Dec. 21, 2022, which claims priority to Japanese Patent Application No. 2021-212958, filed on Dec. 27, 2021. The contents of these applications are hereby incorporated by reference in their entireties.

TECHNICAL FIELD

The present invention relates to an optical filter that transmits a visible light and a specific near-infrared light and shields light between two regions of the visible light and the specific near-infrared light.

BACKGROUND ART

For an imaging device including a solid state image sensor, an application thereof is extended to a device that takes an image anytime during day and night, such as a monitoring camera or an in-vehicle camera. In such a device, it is necessary to acquire (color) images based on visible light and (monochrome) images based on infrared light.

Therefore, there has been studied use of an optical filter having, in addition to a near-infrared ray cut filter function for transmitting a visible light and correctly reproducing an image based on the visible light, a function of selectively transmitting a specific near-infrared light for sensing, that is, a dual band pass filter. Patent Literatures 1 to 4 disclose a dual band pass filter type optical filter including a dielectric multilayer film and a near-infrared light absorbing dye.

CITATION LIST

Patent Literature

Patent Literature 1: JP2021-6901A

Patent Literature 2: JP2019-124946A

Patent Literature 3: WO2015/056734

Patent Literature 4: JP2016-200771A

SUMMARY OF INVENTION

In recent years, since a laser light of 840 nm to 870 nm is used in a sensor in the imaging field, an optical filter that can transmit a near-infrared light in such a region and shield other near-infrared light that causes noise is required.

In an optical filter including a dielectric multilayer film, since an optical film thickness of the dielectric multilayer film changes depending on an incident angle of light, there is such a problem that a spectral transmittance curve changes depending on the incident angle. For example, as the incident angle of light increases, the reflection characteristic shifts to a short wavelength side, and as a result, the reflection characteristic may deteriorate in a region to be originally shielded. Such a phenomenon is likely to occur more strongly as the incident angle is larger. When such a filter is used, spectral sensitivity of the solid state image sensor may be affected by the incident angle. With a reduction in height of camera modules in recent years, use under a condition of a high incident angle is assumed, and therefore an optical filter that is hardly affected by an incident angle is required.

In particular, there is a concern that a shift around 700 nm affects image characteristics, and a shift between 840 nm and 870 nm affects a sensor light amount.

On the other hand, the optical filter described in Patent Literature 1 has a low transmittance for a light of 840 nm to 870 nm and is not sufficient in terms of sensor sensitivity. The optical filter described in Patent Literature 2 has a low transmittance for a visible light and a light of 840 nm to 870 nm, especially at a high incident angle, has a transmittance for a light around 840 nm that changes depending on the incident angle, and cannot be said to have sufficient spectral characteristics. The optical filter described in Patent Literature 3 has a low transmittance for a light of 840 nm to 870 nm, especially at a high incident angle, cannot be said to have sufficient sensor sensitivity, has a transmittance for a light around 840 nm that changes depending on the incident angle, and cannot be said to have sufficient spectral characteristics. The optical filter described in Patent Literature 4 has a transmittance for a light around 840 nm that changes depending on the incident angle, and cannot be said to have sufficient spectral characteristics.

An object of the present invention is to provide an optical filter that has an excellent transmissivity for a visible light and a specific near-infrared light and an excellent shielding property for other near-infrared light even at a high incident angle.

The present invention provides an optical filter having the following configuration.

[1] An optical filter including:

a substrate; and a dielectric multilayer film (A) laid on or above at least one main surface of the substrate as an outermost layer, the dielectric multilayer film (A) being configured to reflect a light in a wavelength region of 900 nm or more, in which the substrate includes a resin film including a resin and a dye (I) having a maximum absorption wavelength of 700 nm to 800 nm in the resin, the optical filter transmits a visible light and a light in at least a partial wavelength 5 region of 750 nm to 1000 nm, and the optical filter satisfies all of the following spectral characteristics (i-1) to (i-9):

(i-1) when a side of the dielectric multilayer film (A) is set as an incident direction, in a spectral reflectance curve at an incident angle of 5 degrees, a wavelength IR50(R) at which a reflectance is 50% is in a range of 900 nm to 970 nm;

(i-2) in a spectral transmittance curve at an incident angle of 0 degrees, a wavelength IR50(L) at which a transmittance is 50% is in a range of 780 nm to 850 nm;

(i-3) an absolute value of a difference between the wavelength IR50(R) and the wavelength IR50(L) is 110 nm or more;

(i-4) in the spectral transmittance curve at the incident angle of 0 degrees, an average transmittance $T_{440\text{-}600\,(0\,deg)AVE}$ in a wavelength of 440 nm to 600 nm is 86% or more;

(i-5) in the spectral transmittance curve at the incident angle of 0 degrees, an average transmittance $T_{700\text{-}800(0\,deg)AVE}$ in a wavelength of 700 nm to 800 nm is 5% or less;

(i-6) in the spectral transmittance curve at the incident angle of 0 degrees, an average transmittance $T_{840\text{-}870\ (0\ deg)AVE}$ in a wavelength of 840 nm to 870 nm is 88% or more;

(i-7) in the spectral transmittance curve at the incident angle of 0 degrees, an average transmittance $T_{950\text{-}1200\ (0\ deg)AVE}$ in a wavelength of 950 nm to 1200 nm is 5% or less;

(i-8) in a spectral transmittance curve at an incident angle of 40 degrees, an average transmittance $T_{840\text{-}870\ (40\ deg)AVE}$ in a wavelength of 840 nm to 870 nm is 70% or more; and (i-9) an absolute value of a difference between $TR50_{\_780\text{-}850(0\ deg)}$ and $IR50_{\_780\text{-}850(40\ deg)}$ is 8 nm or less, where the $IR50_{\_780\text{-}850(0\ deg)}$ is a wavelength at which a transmittance is 50% in a wavelength range of 780 nm to 850 nm in the spectral transmittance curve at the incident angle of 0 degrees, and the $IR50_{\_780\text{-}850(40\ deg)}$ is a wavelength at which a transmittance is 50% in a wavelength range of 780 nm to 850 nm in the spectral transmittance curve at the incident angle of 40 degrees.

[2] The optical filter according to [1], in which the optical filter further satisfies the following spectral characteristic (i-16):

(i-16) an absolute value of a difference between the average transmittance $T_{840\text{-}870(0\ deg)AVE}$ in the wavelength range of 840 nm to 870 nm in the spectral transmittance curve at the incident angle of 0 degrees and the average transmittance $T_{840\text{-}870(40\ deg)AVE}$ in the wavelength range of 840 nm to 870 nm in the spectral transmittance curve at the incident angle of 40 degrees is 25% or less.

[3] The optical filter according to [1] or [2], in which the optical filter further satisfies the following spectral characteristic (i-17):

(i-17) an absolute value of a difference between the average transmittance $T_{440\text{-}600(0\ deg)AVE}$ in the wavelength range of 440 nm to 600 nm in the spectral transmittance curve at the incident angle of 0 degrees and an average transmittance $T_{440\text{-}600\ (40\ deg)AVE}$ in a wavelength range of 440 nm to 600 nm in the spectral transmittance curve at the incident angle of 40 degrees is 5% or less.

[4] The optical filter according to any one of [1] to [3], in which the optical filter further satisfies the following spectral characteristic (i-18):

(i-18) when the side of the dielectric multilayer film (A) is set as the incident direction, in the spectral reflectance curve at the incident angle of 5 degrees, an average reflectance $R_{700\text{-}800\ (5\ deg)AVE}$ in a wavelength of 700 nm to 800 nm is 0% to 50%.

[5] The optical filter according to any one of [1] to [4], in which the substrate further includes a support, the resin film, and a dielectric multilayer film (B) disposed between the support and the resin film, and the dielectric multilayer film (B) satisfies all of the following spectral characteristics (iiB-1) and (iiB-2) when the dielectric multilayer film (B) is formed on a transparent glass substrate:

(iiB-1) in a spectral transmittance curve at an incident angle of 0 degrees, an average transmittance $T_{440\text{-}600\ (0\ deg)AVE}$ in a wavelength range of 440 nm to 600 nm is 85% or more; and (iiB-2) in the spectral transmittance curve at the incident angle of 0 degrees, an average transmittance $T_{880\text{-}1200\ (0\ deg)AVE}$ in a wavelength range of 880 nm to 1200 nm is 85% or less.

[6] The optical filter according to any one of [1] to [5], in which the dielectric multilayer film (A) satisfies all of the following spectral characteristics (iiA-1) to (iiA-6) when the dielectric multilayer film (A) is formed on a transparent glass substrate:

(iiA-1) in a spectral transmittance curve at an incident angle of 0 degrees, an average transmittance $T_{440\text{-}600\ (0\ deg)AVE}$ in a wavelength range of 440 nm to 600 nm is 90% or more;

(iiA-2) in the spectral transmittance curve at the incident angle of 0 degrees, an average transmittance $T_{840\text{-}870(0\ deg)AVE}$ in a wavelength range of 840 nm to 870 nm is 90% or more;

(iiA-3) in a spectral transmittance curve in a wavelength range of 440 nm to 600 nm, an absolute value of a difference between the average transmittance $T_{440\text{-}600\ (0\ deg)AVE}$ at the incident angle of 0 degrees and an average transmittance $T_{440\text{-}600\ (40\ deg)AVE}$ at an incident angle of 40 degrees is 10% or less;

(iiA-4) in a spectral transmittance curve in a wavelength range of 840 nm to 870 nm, an absolute value of a difference between the average transmittance $T_{840\text{-}870\ (0\ deg)AVE}$ at the incident angle of 0 degrees and an average transmittance $T_{840\text{-}870\ (40\ deg)AVE}$ at an incident angle of 40 degrees is 2% or less;

(iiA-5) in the spectral transmittance curve at the incident angle of 0 degrees, a wavelength IR50(L) at which a transmittance is 50% is in a range of 900 nm to 960 nm; and (iiA-6) in the spectral transmittance curve at the incident angle of 0 degrees, an average transmittance $T_{950\text{-}1200\ (0\ deg)AVE}$ in a wavelength range of 950 nm to 1200 nm is 5% or less.

[7] The optical filter according to any one of [1] to [6], in which the support is a transparent glass.

[8] The optical filter according to any one of [1] to [7], in which the resin film has a thickness of 3 μm or less.

[9] The optical filter according to any one of [1] to [8], in which the resin in the resin film has a glass transition temperature of 200° C. or higher, and a content of the dye (I) in the resin film is 15 mass % or less.

[10] The optical filter according to any one of [1] to [9], in which the resin film satisfies all of the following spectral characteristics (iii-1) to (iii-5):

(iii-1) an average internal transmittance $T_{440\text{-}600\ AVE}$ in a spectral transmittance curve at a wavelength of 440 nm to 600 nm is 85% or more;

(iii-2) a wavelength IR50 at which an internal transmittance is 50% is in a range of 620 nm to 680 nm;

(iii-3) an average internal transmittance $T_{700\text{-}800AVE}$ in a spectral transmittance curve at a wavelength of 700 nm to 800 nm is 5% or less;

(iii-4) a wavelength IR50 at which an internal transmittance is 50% is in a range of 780 nm to 850 nm; and (iii-5) an average internal transmittance $T_{840\text{-}870AVE}$ in a spectral transmittance curve at a wavelength of 840 nm to 870 nm is 90% or more.

[11] The optical filter according to any one of [1] to [10], in which the dye (I) includes:

at least one selected from compounds (IA) having a maximum absorption wavelength in a wavelength region of 700 nm or more and less than 730 nm in the resin;

at least one selected from compounds (IB) having a maximum absorption wavelength in a wavelength region of 730 nm or more and less than 760 nm in the resin; and at least one selected from compounds (IC) having a maximum absorption wavelength in a wavelength region of 760 nm or more and less than 780 nm in the resin.

[12] An imaging device including:

the optical filter according to any one of [1] to [11].

According to the present invention, an optical filter that has an excellent transmissivity for a visible light and a specific near-infrared light and an excellent shielding property for other near-infrared light even at a high incident angle can be provided. The optical filter of the present invention is particularly an optical filter that has an excellent transmissivity in a near-infrared light region of 840 nm to 870 nm, which is a sensing wavelength region, even at a high incident angle, in which a spectral transmittance curve of a boundary region between such a wavelength region and a wavelength region of less than 840 nm to be shielded hardly shifts depending on an incident angle, and is hardly affected by the incident angle.

DESCRIPTION OF EMBODIMENTS

Figure 1:
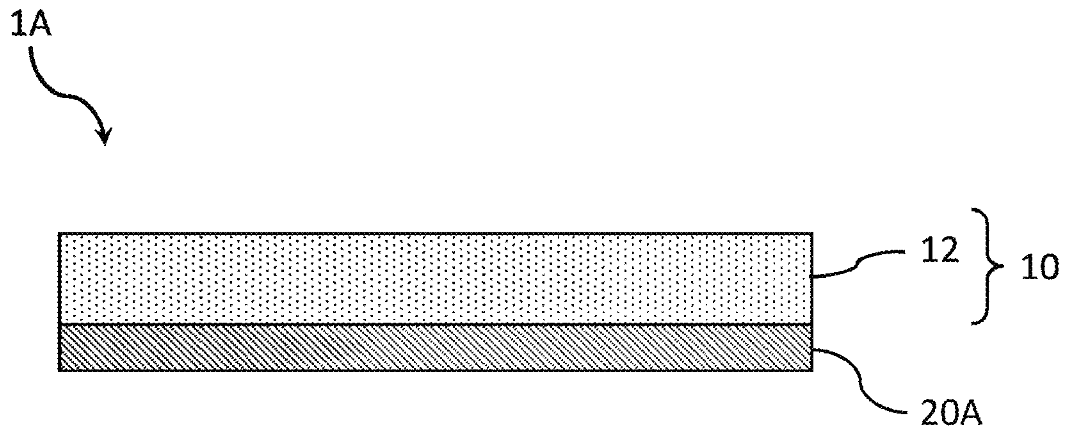
FIG. 1 is a cross-sectional view schematically illustrating an example of an optical filter according to one embodiment.

Hereinafter, embodiments of the present invention will be described.

In the present description, a near-infrared ray absorbing dye may be abbreviated as an "NIR dye", and an ultraviolet ray absorbing dye may be abbreviated as a "UV dye".

In the present description, a compound represented by a formula (I) is referred to as a compound (I). The same applies to compounds represented by other formulae. A dye composed of the compound (I) is also referred to as a dye (I), and the same applies to other dyes. In addition, a group represented by the formula (I) is also referred to as a group (I), and the same applies to groups represented by other formulae.

In the present description, an internal transmittance is a transmittance obtained by subtracting an influence of interface reflection from a measured transmittance, which is represented by a formula {measured transmittance/(100−reflectance)}×100.

In the present description, spectrums of a transmittance of a substrate and a transmittance of a resin film including a case where a dye is contained in a resin are all "internal transmittance" even when described as a "transmittance". On the other hand, a transmittance of a dielectric multilayer film and a transmittance of an optical filter including the dielectric multilayer film are a measured transmittance.

In the present description, a transmittance of, for example, 90% or more in a specific wavelength region means that the transmittance does not fall below 90% in the entire wavelength region, that is, a minimum transmittance is 90% or more in the wavelength region. Similarly, a transmittance of, for example, 1% or less in a specific wavelength region means that the transmittance does not exceed 1% in the entire wavelength region, that is, a maximum transmittance is 1% or less in the wavelength region. The same applies to the internal transmittance. An average transmittance and an average internal transmittance in a specific wavelength region are an arithmetic mean of a transmittance and an internal transmittance per 1 nm in the wavelength region.

Spectral characteristics can be measured by using an ultraviolet-visible spectrophotometer.

In the present description, the symbol "-" or the word "to" that is used to express a numerical range includes the numerical values before and after the symbol or the word as the upper limit and the lower limit of the range, respectively.

<Optical Filter>

An optical filter according to one embodiment of the present invention (hereinafter, also referred to as the "present filter") includes a substrate and a dielectric multilayer film (A) laid, as an outermost layer, on or above at least one main surface of the substrate, transmits a visible light and a light in at least a partial wavelength region of 750 nm to 1000 nm, and satisfies specific spectral characteristics to be described later.

Here, the dielectric multilayer film (A) reflects a light in a wavelength region of 900 nm or more.

The substrate includes a resin film including a resin and a dye (I) having a maximum absorption wavelength of 700 nm to 800 nm in the resin. The dye (I) is an NIR dye. When the substrate contains a dye that absorbs near-infrared rays, occurrence of a shift in reflection characteristics of the dielectric multilayer film at a high incident angle can be covered by absorption characteristics of the substrate. Each dye and resin will be described later.

A configuration example of the present filter will be described with reference to the drawings. FIGS. 1 to 4 are cross-sectional views schematically illustrating examples of the optical filter according to one embodiment.

An optical filter 1Aillustrated in FIG. 1 is an example in which a dielectric multilayer film 20A is provided on or above one main surface of a substrate 10 including a resin film 12. The dielectric multilayer film 20A corresponds to the dielectric multilayer film (A) that reflects a light in a wavelength region of 900 nm or more.

Noted that "including a specific layer on or above a main surface of a substrate" is not limited to a case where the layer is provided in contact with the main surface of the substrate, and includes a case where another functional layer is provided between the substrate and the layer.

Figure 2:
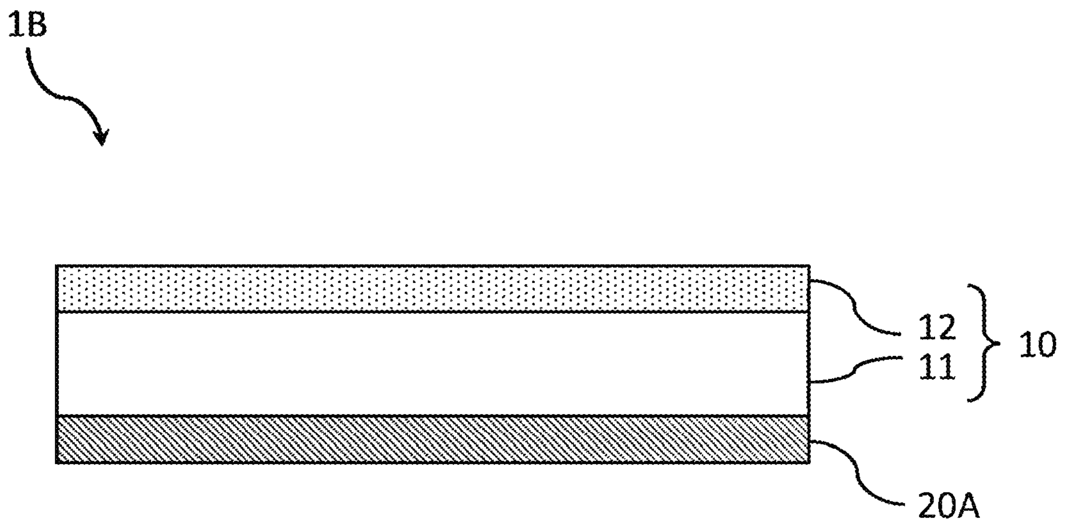
FIG. 2 is a cross-sectional view schematically illustrating another example of an optical filter according to one embodiment.

An optical filter 1B illustrated in FIG. 2 is an example in which the dielectric multilayer film 20A is provided on or above one main surface of the substrate 10 including a support 11 and the resin film 12.

In the optical filter 1B in FIG. 2, the dielectric multilayer film 20A is provided on a surface of the support 11, but the dielectric multilayer film 20A may be provided on a surface of the resin film 12.

Figure 3:
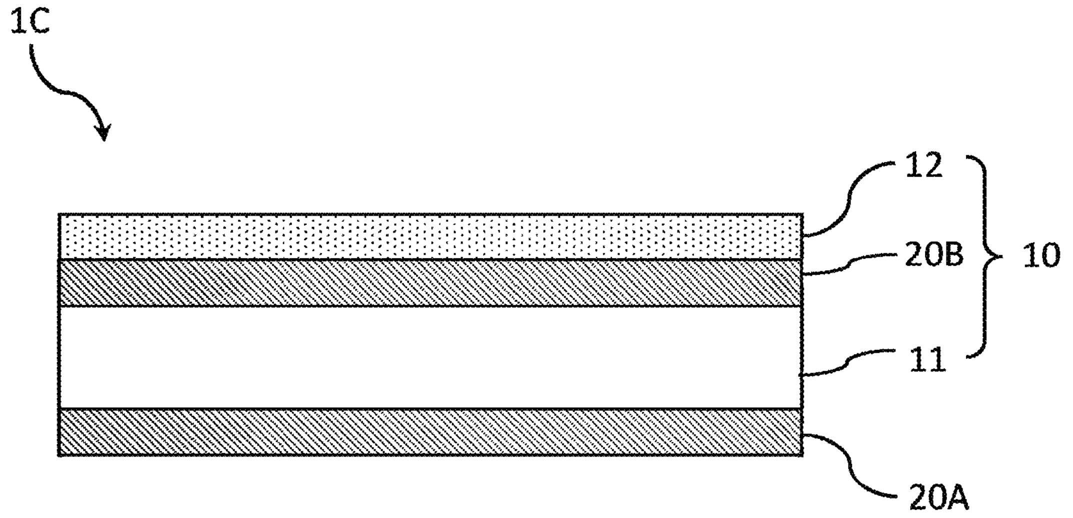
FIG. 3 is a cross-sectional view schematically illustrating another example of an optical filter according to one embodiment.

An optical filter 1C illustrated in FIG. 3 is an example in which the dielectric multilayer film 20A is provided on or above one main surface of the substrate 10 including a dielectric multilayer film 20B between the support 11 and the resin film 12. The dielectric multilayer film 20B corresponds to a dielectric multilayer film (B) that satisfies specific spectral characteristics to be described later.

Figure 4:
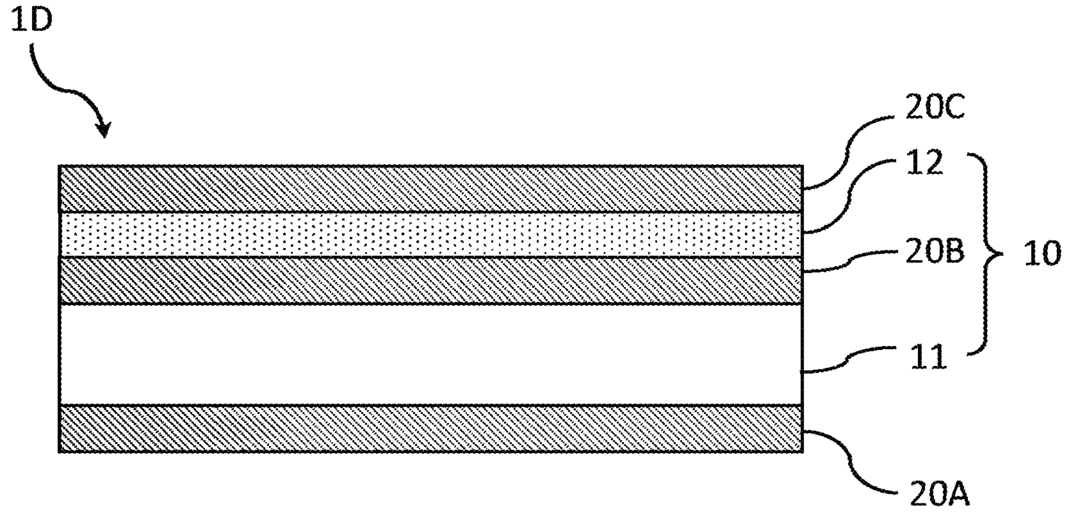
FIG. 4 is a cross-sectional view schematically illustrating another example of an optical filter according to one embodiment.

An optical filter 1D illustrated in FIG. 4 is an example in which the dielectric multilayer film 20A is provided on or above one main surface of the substrate 10 including the dielectric multilayer film 20B between the support 11 and the resin film 12, and a dielectric multilayer film 20C is provided on or above the other main surface of the substrate 10. The dielectric multilayer film 20C is, for example, a film having an antireflection function.

The optical filter of the present invention transmits a visible light and a light in at least a partial wavelength region of 750 nm to 1000 nm, and satisfies all of the following spectral characteristics (i-1) to (i-9):

(i-1) when a side of the dielectric multilayer film (A) is set as an incident direction, in a spectral reflectance curve at an incident angle of 5 degrees, a wavelength IR50(R) at which a reflectance is 50% is in a range of 900 nm to 970 nm;

(i-2) in a spectral transmittance curve at an incident angle of 0 degrees, a wavelength IR50(L) at which a transmittance is 50% is in a range of 780 nm to 850 nm;

(i-3) an absolute value of a difference between the wavelength IR50(R) and the wavelength IR50(L) is 110 nm or more;

(i-4) in the spectral transmittance curve at the incident angle of 0 degrees, an average transmittance $T_{440\text{-}600\ (0\ deg)AVE}$ in a wavelength of 440 nm to 600 nm is 86% or more;

(i-5) in the spectral transmittance curve at the incident angle of 0 degrees, an average transmittance $T_{700\text{-}800\ (0\ deg)AVE}$ in a wavelength of 700 nm to 800 nm is 5% or less;

(i-6) in the spectral transmittance curve at the incident angle of 0 degrees, an average transmittance $T_{840\text{-}870\ (0\ deg)AVE}$ in a wavelength of 840 nm to 870 nm is 88% or more;

(i-7) in the spectral transmittance curve at the incident angle of 0 degrees, an average transmittance $T_{950\text{-}1200\ (0\ deg)AVE}$ in a wavelength of 950 nm to 1200 nm is 5% or less;

(i-8) in a spectral transmittance curve at an incident angle of 40 degrees, an average transmittance $T_{840\text{-}870\ (40\ deg)AVE}$ in a wavelength of 840 nm to 870 nm is 70% or more; and (i-9) an absolute value of a difference between $IR50_{\_780\text{-}850(0\ deg)}$ and $IR50_{\_780\text{-}850(40\ deg)}$ is 8 nm or less, where the $IR50_{\_780\text{-}850(0\ deg)}$ is a wavelength at which a transmittance is 50% in a wavelength range of 780 nm to 850 nm in the spectral transmittance curve at the incident angle of 0 degrees, and the $IR50_{\_780\text{-}850(40\ deg)}$ is a wavelength at which a transmittance is 50% in a wavelength range of 780 nm to 850 nm in the spectral transmittance curve at the incident angle of 40 degrees.

The present filter that satisfies all of the spectral characteristics (i-1) to (i-9) is an optical filter that has an excellent transmissivity for a visible light and a specific near-infrared light, especially for a wavelength region of 840 nm to 870 nm and an excellent shielding property of other near-infrared light even at a high incident angle.

By satisfying the spectral characteristics (i-1) to (i-3) at the same time, an optical filter that keeps a high transmittance for a visible light and maintains an oblique incidence characteristic, which is related to image quality around 700 nm, even at a high incident angle, while maintaining a transmittance in a sensing wavelength region of 840 nm to 870 nm high with no change at a high incident angle can be provided.

In the spectral characteristic (i-1), the wavelength IR50 (R) is preferably in a range of 910 nm to 960 nm, and more preferably in a range of 920 nm to 950 nm.

In the spectral characteristic (i-2), the wavelength IR50 (L) is preferably in a range of 800 nm to 840 nm, and more preferably in a range of 800 nm to 830 nm.

Regarding the spectral characteristic (i-3), the absolute value of the difference between the wavelength IR50(R) and the wavelength IR50(L) is preferably 115 nm or more, and more preferably 120 nm or more.

The spectral characteristic (i-1) substantially means a reflection characteristic of the dielectric multilayer film (A). The vicinity of the wavelength IR50(R) at which the reflectance is 50% corresponds to a boundary portion between a reflection region and a non-reflection region. In general, it is known that a reflection characteristic of a dielectric multilayer film shifts to a shorter wavelength side as the incident angle is higher. In consideration of this, in order to keep the average transmittance of the optical filter for 840 nm to 870 nm high even at a high incident angle, it is preferable that the wavelength IR50(R) at the incident angle of 5 degrees be sufficiently separated to a wavelength side longer than the sensing wavelength region of 840 nm to 870 nm. Therefore, for example, the dielectric multilayer film (A) satisfying a spectral characteristic (iiA-5) (a wavelength IR50 at which a transmittance is 50% is in a range of 900 nm to 960 nm) to be described later is used.

The spectral characteristic (i-2) substantially means a transmission (absorption) characteristic of the resin film. In the spectral characteristic (i-2), the vicinity of the wavelength IR50(L) at which the transmittance is 50% corresponds to a boundary portion between a transmission region and a non-transmission region. In order to keep the average transmittance in the sensing wavelength region of 840 nm to 870 nm high even at a high incident angle and sufficiently shield a light of 700 nm to 800 nm between a visible light region and a sensing wavelength region, it is preferable that the wavelength IR50(L) be sufficiently separated from the wavelength IR50(R). Therefore, for example, a resin film that does not absorb a light of 840 nm to 870 nm and can widely absorb a light of 700 nm to 800 nm can be used.

Regarding the spectral characteristic (i-3), it is preferable that a degree of separation between the wavelength IR50(R) and the wavelength IR50(L) be within the above range, since the transmittance can be maintained high with no change even at a high incident angle in the sensing wavelength region of 840 nm to 870 nm in particular.

Satisfying the spectral characteristic (i-4) means that the transmissivity in the visible light region of 440 nm to 600 nm is excellent.

The average transmittance $T_{440\text{-}600\ (0\ deg)AVE}$ is preferably 87% or more, and more preferably 88% or more.

Satisfying the spectral characteristic (i-5) means that the shielding property for the near-infrared light region of 700 nm to 800 nm is excellent.

The average transmittance $T_{700\text{-}800\ (0\ deg)AVE}$ is preferably 4.5% or less, and more preferably 4.0% or less.

Satisfying the spectral characteristic (i-6) means that the transmissivity in the near-infrared light region of 840 nm to 870 nm is excellent.

The average transmittance $T_{840\text{-}870\ (0\ deg)AVE}$ is preferably 90% or more, and more preferably 92% or more.

In order to satisfy the spectral characteristics (i-4) to (i-6), for example, a resin film that can widely absorb a light of 700 nm to 800 nm while maintaining a high visible transmittance and transmits a light of 840 nm to 870 nm without absorbing the light is used. For such a resin film, for example, it is preferable to combine, as the NIR dye in the resin film, an NIR dye having a maximum absorption wavelength of 700 nm to 730 nm, an NIR dye having a maximum absorption wavelength of 730 nm to 760 nm, and an NIR dye having a maximum absorption wavelength of 760 nm to 780 nm as will be described later.

Satisfying the spectral characteristic (i-7) means that the shielding property for the near-infrared light region of 950 nm to 1200 nm is excellent.

The average transmittance $T_{950\text{-}200(0\ deg)AVE}$ is preferably 4% or less, and more preferably 3% or less.

In order to satisfy the spectral characteristic (i-7), for example, by using the dielectric multilayer film (A) that satisfies a spectral characteristic (iiA-6) (an average transmittance $T_{950\text{-}1200\ (0\ deg)AVE}$ in a wavelength range of 950 nm to 1200 nm is 5% or less) to be described later, a light of 950 nm or more is shielded by the reflection characteristic of the dielectric multilayer film.

Satisfying the spectral characteristic (i-8) means that the transmissivity in a near-infrared light region of 840 nm to 870 nm is excellent even at a high incident angle.

The average transmittance $T_{840\text{-}870\ (40\ deg)AVE}$ is preferably 88% or more, and more preferably 90% or more.

In order to satisfy the spectral characteristic (i-8), for example, the spectral characteristics (i-1) to (i-3) are satisfied, and a resin film satisfying spectral characteristics (iii-3) to (iii-5) to be described later is used.

Satisfying the spectral characteristic (i-9) means that a spectral curve for a region of 780 nm to 850 nm hardly shifts even at a high incident angle. The region of 780 nm to 850 nm corresponds to a boundary region between a sensing wavelength region of 840 nm to 870 nm to be transmitted and a wavelength region of less than 840 nm to be shielded. It is preferable that a spectral curve for such a boundary region be difficult to shift depending on the incident angle, since a color tone of an image does not change even at a high incident angle, and an amount of a light at the sensing wavelength does not change easily.

The absolute value in the spectral characteristic (i-9) is preferably 7 nm or less, and more preferably 6 nm or less.

In order to satisfy the spectral characteristic (i-9), for example, when shielding a light around the sensing wavelength region, a light of 700 nm to 800 nm on the short wavelength side is shielded by absorption of an NIR dye, which is unlikely to cause a spectral curve shift depending on the incident angle, and a light of 900 nm or more on the long wavelength side is shielded by reflection from the dielectric multilayer film.

The optical filter of the present invention preferably further satisfies the following spectral characteristics (i-10) and (i-11):

(i-10) in the spectral transmittance curve at the incident angle of 0 degrees, a wavelength IR50(V) at which a transmittance is 50% is in a range of 620 nm to 680 nm, and (i-11) in the spectral transmittance curve at the incident angle of 0 degrees, a wavelength TR50(S) at which a transmittance is 50% is in a range of 780 nm to 850 nm.

Satisfying the spectral characteristic (i-10) means that a spectral spectrum is close to a spectral spectrum suitable for human visibility.

The wavelength IR50(V) is preferably in a range of 630 nm to 680 nm, and more preferably in a range of 630 nm to 650 nm.

In order to satisfy the spectral characteristic (i-10), for example, a resin film containing an NIR dye having a maximum absorption wavelength of 700 nm to 730 nm is provided.

Satisfying the spectral characteristic (i-11) means that an amount of light of the sensing wavelength can be increased.

The wavelength IR50(S) is preferably in a range of 800 nm to 840 nm, and more preferably in a range of 800 nm to 830 nm.

In order to satisfy the spectral characteristic (i-11), for example, a resin film containing an NIR dye that has a steep absorption rise on the long wavelength side and has a maximum absorption wavelength of 760 nm to 780 nm is provided.

The optical filter according to the present invention preferably further satisfies the following spectral characteristic (i-12):

(i-12) an absolute value of a difference between $V50_{-620\text{-}680(0\ deg)}$ and $V50_{-620\text{-}680\ (40\ deg)}$ is 8 nm or less, where the $V50_{-620\text{-}680(0\ deg)}$ is a wavelength at which a transmittance is 50% in a wavelength range of 620 nm to 680 nm in the spectral transmittance curve at the incident angle of 0 degrees, and the $V50_{-620\text{-}680(40\ deg)}$ is a wavelength at which a transmittance is 50% in the wavelength range of 620 nm to 680 nm in the spectral transmittance curve at the incident angle of 40 degrees.

Satisfying the spectral characteristic (i-12) means that an image quality does not change even when the incident angle changes.

The absolute value in the spectral characteristic (i-12) is preferably 7 nm or less, and more preferably 6 nm or less.

In order to satisfy the spectral characteristic (i-12), for example, a resin film containing an NIR dye having a maximum absorption wavelength of 700 nm to 730 nm is provided.

The optical filter of the present invention preferably further satisfies the following spectral characteristics (i-13) to (i-15):

(i-13) in the spectral transmittance curve at the incident angle of 40 degrees, an average transmittance $T_{440\text{-}600(40\ deg)AVE}$ in a wavelength of 440 nm to 600 nm is 83% or more;

(i-14) in the spectral transmittance curve at the incident angle of 40 degrees, an average transmittance $T_{700\text{-}800\ (40\ deg)AVE}$ in a wavelength of 700 nm to 800 nm is 5% or less; and (i-15) in the spectral transmittance curve at the incident angle of 40 degrees, an average transmittance $T_{950\text{-}1200\ (40\ deg)AVE}$ in a wavelength of 950 nm to 1200 nm is 7% or less.

Satisfying the spectral characteristics (i-13) to (i-15) means that the transmissivity for a visible light and the shielding property for a near-infrared light other than a light of the sensing wavelength are excellent even at a high incident angle.

The average transmittance $T_{440\text{-}600\ (40\ deg)AVE}$ is preferably 85% or more, and more preferably 86% or more.

The average transmittance $T_{700\text{-}800\ (40\ deg)AVE}$ is preferably 3% or less, and more preferably 4% or less.

The average transmittance $T_{950\text{-}1200\ (40\ deg)AVE}$ is preferably 4% or less, and more preferably 3% or less.

In order to satisfy the spectral characteristics (i-13) to (i-15), for example, a resin film that can widely absorb a light of 700 nm to 800 nm and transmit a visible light and a light in a region of 840 nm to 870 nm without absorbing the light, and a dielectric multilayer film that widely transmits a visible light to a light of 950 nm and further shields a light of 950 nm or more by reflection is combined.

The optical filter according to the present invention preferably further satisfies the following spectral characteristic (i-16):

(i-16) an absolute value of a difference between the average transmittance $T_{840\text{-}870\ (0\ deg)AVE}$ in the wavelength range of 840 nm to 870 nm in the spectral transmittance curve at the incident angle of 0 degrees and the average transmittance $T_{840\text{-}870\ (40\ deg)AVE}$ in the wavelength range of 840 nm to 870 nm in the spectral transmittance curve at the incident angle of 40 degrees is 25% or less.

Satisfying the spectral characteristic (i-16) means that the change in an average transmittance in 840 nm to 870 nm is small and the transmissivity is excellent even at a high incident angle.

The absolute value in the spectral characteristic (i-16) is preferably 20% or less, and more preferably 18% or less.

In order to satisfy the spectral characteristic (i-16), for example, the spectral characteristic (i-3) is sufficiently satisfied.

The optical filter according to the present invention preferably further satisfies the following spectral characteristic (i-17):

(i-17) an absolute value of a difference between the average transmittance $T_{440\text{-}600\ (0\ deg)AVE}$ in the wavelength range of 440 nm to 600 nm in the spectral transmittance curve at the incident angle of 0 degrees and an average transmittance $T_{440\text{-}600\ (40\ deg)AVE}$ in a wavelength range of 440 nm to 600 nm in the spectral transmittance curve at the incident angle of 40 degrees is 5% or less.

Satisfying the spectral characteristic (i-17) means that the change in a visible light transmittance (occurrence of ripple) is small and the transmissivity is excellent even at a high incident angle.

The absolute value in the spectral characteristic (i-17) is preferably 4% or less, and more preferably 3% or less.

In order to satisfy the spectral characteristic (i-17), for example, in the dielectric multilayer film (A), a plurality of thin dielectric films each having a thickness of 30 nm or less is laid to adjust the reflectance in the visible light region.

The optical filter according to the present invention preferably further satisfies the following spectral characteristic (i-18):

(i-18) when the side of the dielectric multilayer film (A) is set as the incident direction, in the spectral reflectance curve at the incident angle of 5 degrees, an average reflectance $R_{700\text{-}800(5\ deg)AVE}$ in a wavelength of 700 nm to 800 nm is 0% to 50%.

Satisfying the spectral characteristic (i-18) means that a light in the near-infrared light region of 700 nm to 800 nm is gently reflected. This is preferable since a light shielding property in 700 nm to 800 nm can be imparted to an extent that the average transmittance for a visible light is not impaired even at a higher incident angle (40 degrees).

The average reflectance $R_{700\text{-}800(5\ deg)AVE}$ is preferably 0% to 40%, and more preferably 0% to 30%.

<Dielectric Multilayer Film (A)>

In the present filter, the dielectric multilayer film (A) is laid, as an outermost layer, on or above one main surface of the substrate. The dielectric multilayer film (A) is a reflection layer designed to reflect a light in a wavelength region of 900 nm or more.

The dielectric multilayer film (A) preferably satisfies all of the following spectral characteristics (iiA-1) to (iiA-6) when the dielectric multilayer film (A) is formed on a transparent glass substrate:

(iiA-1) in a spectral transmittance curve at an incident angle of 0 degrees, an average transmittance $T_{440\text{-}600\ (0\ deg)AVE}$ in a wavelength range of 440 nm to 600 nm is 90% or more;

(iiA-2) in the spectral transmittance curve at the incident angle of 0 degrees, an average transmittance $T_{840\text{-}870\ (0\ deg)AVE}$ in a wavelength range of 840 nm to 870 nm is 90% or more;

(iiA-3) in a spectral transmittance curve in a wavelength range of 440 nm to 600 nm, an absolute value of a difference between the average transmittance $T_{440\text{-}600\ (0\ deg)AVE}$ at the incident angle of 0 degrees and an average transmittance $T_{440\text{-}600\ (40\ deg)AVE}$ at an incident angle of 40 degrees is 10% or less;

(iiA-4) in a spectral transmittance curve in a wavelength range of 840 nm to 870 nm, an absolute value of a difference between the average transmittance $T_{840\text{-}870(0\ deg)AVE}$ at the incident angle of 0 degrees and an average transmittance $T_{840\text{-}870\ (40\ deg)AVE}$ at an incident angle of 40 degrees is 2% or less;

(iiA-5) in the spectral transmittance curve at the incident angle of 0 degrees, a wavelength IR50(L) at which a transmittance is 50% is in a range of 900 nm to 960 nm; and (iiA-6) in the spectral transmittance curve at the incident angle of 0 degrees, an average transmittance $T_{950\text{-}1200\ (0\ deg)AVE}$ in a wavelength range of 950 nm to 1200 nm is 5% or less.

The dielectric multilayer film (A) satisfying the above spectral characteristics is a reflection layer designed to widely transmit a light in the visible light region and a light in the near-infrared light region up to 900 nm including the sensing wavelength region of 840 nm to 870 nm as shown in the spectral characteristics (iiA-1) and (iiA-2), and to reflect a light in the near-infrared light region of 950 nm or more as shown in the spectral characteristics (iiA-5) and (iiA-6). In addition, as shown in the spectral characteristics (iiA-3) and (iiA-4), both the fluctuation in transmittance (ripple) in a visible light and the fluctuation in transmittance in the sensing wavelength region of 840 nm to 870 nm are small even at a high incident angle, and good spectral characteristics are exhibited.

A light in a region of 700 nm to 800 nm between the visible light region and the sensing wavelength region of 840 nm to 870 nm is preferably absorbed by the NIR dye to be described later. The filter of the present invention has an excellent near-infrared light shielding property as a whole optical filter due to the reflection characteristic of the dielectric multilayer film (A) and the absorption characteristic of the NIR dye.

The average transmittance $T_{440\text{-}600\ (0\ deg)AVE}$ is more preferably 91% or more, and particularly preferably 92% or more.

The average transmittance $T_{840\text{-}870\ (0\ deg)AVE}$ is more preferably 91% or more, and particularly preferably 92% or more.

The absolute value of the difference between the average transmittance $T_{440\text{-}600\ (0\ deg)AVE}$ and the average transmittance $T_{440\text{-}600\ (40\ deg)AVE}$ is more preferably 91% or less, and particularly preferably 92% or less.

The absolute value of the difference between the average transmittance $T_{840\text{-}870\ (0\ deg)AVE}$ and the average transmittance $T_{840\text{-}870\ (40\ deg)AVE}$ is more preferably 6% or less, and particularly preferably 3% or less.

The wavelength IR50 in (iiA-5) is more preferably in a range of 910 nm to 960 nm, and particularly preferably in a range of 920 nm to 950 nm.

The average transmittance $T_{950\text{-}1200\ (0\ deg)AVE}$ is more preferably 3% or less, and particularly preferably 2% or less.

In order to obtain the dielectric multilayer film (A) satisfying the above spectral characteristics, it is preferable to adjust a film thickness and the number of layers of each dielectric layer within a range to be described later.

<Dielectric Multilayer Film (B)>

The present filter preferably includes the dielectric multilayer film (B) between the support and the resin film in the substrate to be described later. This is more preferable from the viewpoint of alleviating a warpage of the support due to a stress of the dielectric multilayer film, particularly from the viewpoint of reducing the influence on the resin film due to component elution in the case where the support is a glass, and from the viewpoint of enhancing the light shielding property in an infrared region having a wavelength longer than 880 nm.

The dielectric multilayer film (B) preferably satisfies all of the following spectral characteristics (iiB-1) and (iiB-2) when the dielectric multilayer film (B) is formed on the transparent glass substrate:

(iiB-1) in a spectral transmittance curve at an incident angle of 0 degrees, an average transmittance $T_{440\text{-}600(0\ deg)AVE}$ in a wavelength range of 440 nm to 600 nm is 85% or more; and (iiB-2) in the spectral transmittance curve at the incident angle of 0 degrees, an average transmittance $T_{880\text{-}1200\ (0\ deg)AVE}$ in a wavelength range of 880 nm to 1200 nm is 85% or less.

The dielectric multilayer film (B) satisfying the above spectral characteristics is a reflection layer designed to transmit a light in a visible light region and reflect a light in a near-infrared light region having a wavelength longer than that of the sensing wavelength region. It is preferable to provide such a dielectric multilayer film (B), from the viewpoint of enhancing the light shielding property in an infrared band of 880 nm or more even when a transparent material is used as the support.

The average transmittance $T_{440\text{-}600\ (0\ deg)AVE}$ is more preferably 90% or more, and particularly preferably 91% or more.

The average transmittance $T_{880\text{-}1200\ (0\ deg)AVE}$ is more preferably 80% or less, and particularly preferably 70% or less.

In order to obtain the dielectric multilayer film (B) satisfying the above spectral characteristics, it is preferable to adjust a film thickness and the number of layers of each dielectric layer within a range to be described later.

In the present filter, it is preferable that the dielectric multilayer film (A) and the dielectric multilayer film (B) be designed as a near-infrared ray reflection layer (hereinafter, also referred to as an NIR reflection layer). The NIR reflection layer is not limited to a layer having an NIR reflection characteristic, and may be appropriately designed according to a specification of further shielding a light in a wavelength region other than the near-infrared region, for example, a near-ultraviolet region. In the case of further providing another dielectric multilayer film, it is preferable to design the dielectric multilayer film as an NIR reflection layer, a reflection layer having a reflection region other than the near-infrared region, or an antireflection layer.

The NIR reflection layer includes, for example, a dielectric multilayer film in which dielectric films having a low refractive index (low refractive index films) and dielectric films having a high refractive index (high refractive index films) are alternately laid. A refractive index of the high refractive index film is preferably 1.6 or more, and more preferably 2.2 to 2.5. Examples of a material of the high refractive index film include $Ta_2O_5$, $TiO_2$, and $Nb_2O_5$. Among them, $TiO_2$ is preferred from the viewpoint of reproducibility in film formation and refractive index, stability, and the like.

On the other hand, a refractive index of the low refractive index film is preferably less than 1.6, more preferably 1.45 or more and less than 1.55. Examples of a material of the low refractive index film include $SiO_2$ and $SiO_xN_y$. $SiO_2$ is preferred from the viewpoint of reproducibility in film formation, stability, economic efficiency, and the like.

In order for the NIR reflection layer to reflect a light in a specific region, several types of dielectric films having different spectral characteristics may be combined when transmitting and selecting a light in a desired wavelength region.

For example, adjustment can be made according to a material constituting the film, a film thickness of each layer, and the number of layers.

In the dielectric multilayer film (A), a total lamination number of the dielectric multilayer films constituting the reflection layer is preferably 70 or less, more preferably 60 or less, and further preferably 50 or less, and is preferably 30 or more, from the viewpoint of controlling a wavelength band of transmission and light shielding and from the viewpoint of productivity.

A film thickness of the dielectric multilayer film (A) is preferably 2 m to 15 m as a whole.

In the dielectric multilayer film (B), a total lamination number of the dielectric multilayer films constituting the reflection layer is preferably 20 or less, more preferably 15 or less, and further preferably 10 or less, and is preferably 5 or more, from the viewpoint of controlling a wavelength band of transmission and light shielding and from the viewpoint of productivity.

A film thickness of the dielectric multilayer film (B) is preferably 0.1 m to 10 m as a whole.

For formation of the dielectric multilayer film, for example, a vacuum film formation process such as a CVD method, a sputtering method, or a vacuum deposition method, a wet film formation process such as a spraying method or a dipping method, or the like can be used.

The NIR reflection layer may provide a predetermined spectral characteristic by one layer (one group of dielectric multilayer films) or may provide a predetermined spectral characteristic by two layers. When two or more NIR reflection layers are provided, the respective reflection layers may have the same configuration or different configurations. In the case where two or more reflection layers are provided, generally the NIR reflection layer may be formed of a plurality of reflection layers having different reflection bands. In the case where two reflection layers are provided, one of the reflection layers may be a near-infrared reflection layer that shields light in a short wavelength band in the near-infrared region, and the other of the reflection layers may be a near-infrared and near-ultraviolet reflection layer that shields light in both a long wavelength band of the near-infrared region and the near-ultraviolet region.

Examples of the antireflection layer include a dielectric multilayer film, an intermediate refractive index medium, and a moth-eye structure in which the refractive index gradually changes. Among them, a dielectric multilayer film is preferred from the viewpoint of optical efficiency and productivity. The antireflection layer is obtained by alternately laying dielectric multilayer films in the same manner as the reflection layer.

<Substrate>

In the optical filter of the present invention, the substrate includes the support and the resin film containing the NIR dye (I) and a resin to be described later.

<Spectral Characteristics of Resin Film>

The resin film preferably satisfies all of the following spectral characteristics (iii-1) to (iii-5):

(iii-1) an average internal transmittance $T_{440\text{-}600\ AVE}$ in a spectral transmittance curve at a wavelength of 440 nm to 600 nm is 85% or more;

(iii-2) a wavelength IR50 at which an internal transmittance is 50% is in a range of 620 nm to 680 nm;

(iii-3) an average internal transmittance $T_{700\text{-}800\ AVE}$ in a spectral transmittance curve at a wavelength of 700 nm to 800 nm is 5% or less;

(iii-4) a wavelength IR50 at which an internal transmittance is 50% is in a range of 780 nm to 850 nm; and (iii-5) an average internal transmittance $T_{840\text{-}870\ AVE}$ in a spectral transmittance curve at a wavelength of 840 nm to 870 nm is 90% or more.

The resin film satisfying the above spectral characteristics has a high transmittance for a visible light and a near-infrared light of 840 nm to 870 nm, which is a sensing wavelength, as shown in the spectral characteristics (iii-1) and (iii-5), and widely absorbs a near-infrared light of 700 nm to 800 nm, which is a wavelength region between the visible light and the near-infrared light of 700 nm to 800 nm, as shown in the spectral characteristics (iii-2) to (iii-4).

The average internal transmittance $T_{440\text{-}600\ AVE}$ is more preferably 87% or more, and particularly preferably 90% or more.

The wavelength IR50 in the spectral characteristic (iii-2) is more preferably in a range of 620 nm to 660 nm, and particularly preferably in a range of 620 nm to 640 nm. The average internal transmittance $T_{700\text{-}800\ AVE}$ is more preferably 4.5% or less, and particularly preferably 4% or less.

The IR50 in the spectral characteristic (iii-4) is more preferably in a range of 790 nm to 840 nm, and particularly preferably in a range of 800 nm to 830 nm.

The average internal transmittance $T_{840\text{-}870\ AVE}$ is more preferably 92% or more, and particularly preferably 94% or more.

In order to obtain the resin film satisfying the above spectral characteristics, the following NIR dye (I) is preferably contained.

<NIR Dye>

The NIR dye (I) is an NIR dye having a maximum absorption wavelength of 700 nm to 800 nm in the resin. By containing such a dye, a near-infrared light between two transmission regions of the visible light region and the sensing wavelength region can be effectively shielded.

From the viewpoint of maintaining the transmissivity in the visible light region and the transmissivity in the sensing wavelength region, it is preferable that the resin film do not contain a near-infrared ray absorbing dye having a maximum absorption wavelength of 900 nm or more in the resin. It is preferable to shield a light in the region of 900 nm or more by the reflection characteristic of the dielectric multilayer film.

The NIR dye (I) may be composed of one compound, or may contain two or more compounds having a maximum absorption wavelength of 700 nm to 800 nm in the resin. From the viewpoint of efficiently shielding a light between both regions of a visible light and a specific near-infrared light to be transmitted by the present filter, it is preferable to contain three or more compounds having a maximum absorption wavelength of 700 nm to 800 nm in the resin, and in particular, it is more preferable to contain at least one selected from compounds (IA), at least one selected from compounds (IB), and at least one selected from compounds (IC) having the following characteristics.

Compound (IA) having a maximum absorption wavelength in a wavelength region of 700 nm or more and less than 730 nm in the resin Compound (IB) having a maximum absorption wavelength in a wavelength region of 730 nm or more and less than 760 nm in the resin Compound (IC) having a maximum absorption wavelength in a wavelength region of 760 nm or more and less than 780 nm in the resin The compound (IA) is preferably at least one selected from a squarylium dye, a phthalocyanine dye, and a cyanine dye.

The compound (IB) is preferably at least one selected from a squarylium dye, a phthalocyanine dye, and a cyanine dye.

The compound (IC) is preferably at least one selected from a squarylium dye, a phthalocyanine dye, and a cyanine dye.

The NIR dye (I) is preferably a squarylium dye or a cyanine dye from the viewpoint of transmissivity in the visible light region, solubility in the resin, and durability.

As the compound (IA), a compound represented by the following formula (I), which is a squarylium dye, is particularly preferred.

<Squarylium Compound (I)>

[Chem. 1]

(I)

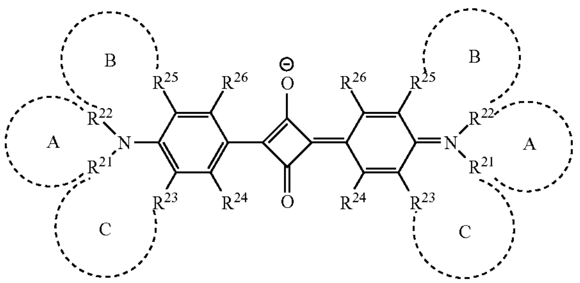

Here, symbols in the above-described formula are as follows.

$R^{24}$ and $R^{26}$ each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, an alaryl group having 7 to 18 carbon atoms which may have a substituent and may have an oxygen atom between carbon atoms, —$NR^{27}R^{28}$ ($R^{27}$ and $R^{28}$ each independently represent a hydrogen atom, an alkyl group having 1 to 20 carbon atoms, —C(═O)—$R^{29}$ ($R^{29}$ is a hydrocarbon group having 1 to 25 carbon atoms which may have a hydrogen atom, a halogen atom, a hydroxyl group, or a substituent, and may have an unsaturated bond, an oxygen atom, or a saturated or unsaturated ring structure between carbon atoms), —$NHR^{30}$ or —$SO_2$—$R^{30}$ ($R^{30}$ is a hydrocarbon group having 1 to 25 carbon atoms in which one or more hydrogen atoms may be substituted with a halogen atom, a hydroxyl group, a carboxy group, a sulfo group, or a cyano group, and may have an unsaturated bond, an oxygen atom, or a saturated or unsaturated ring structure between carbon atoms)), or a group represented by the following formula (S) ($R^{41}$ and $R^{42}$ each independently represent a hydrogen atom, a halogen atom, or an alkyl group or an alkoxy group having 1 to 10 carbon atoms. K is 2 or 3).

[Chem. 2]

(S)

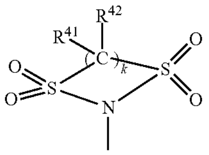

$R^{21}$ and $R^{22}$, $R^{22}$ and $R^{25}$, as well as $R^{21}$ and $R^{23}$ may each be linked to each other to respectively form a heterocycle A, a heterocycle B, and a heterocycle C, in which the number of members is 5 or 6 together with nitrogen atoms.

$R^{21}$ and $R^{22}$ in the case where the heterocycle A is formed represent, as a divalent group -Q- to which $R^{21}$ and $R^{22}$ are bonded, an alkylene group or an alkyleneoxy group in which a hydrogen atom may be substituted with an alkyl group having 1 to 6 carbon atoms, an aryl group having 6 to 10 carbon atoms, or an acyloxy group having 1 to 10 carbon atoms which may have a substituent.

$R^{22}$ and $R^{25}$ in the case where the heterocycle B is formed as well as $R^{21}$ and $R^{23}$ in a case where the heterocycle C is formed represent divalent groups —$X^1$—$Y^1$— and —$X^2$—$Y^2$— to which $R^{22}$ and $R^{25}$ as well as $R^{21}$ and $R^{23}$ are bonded (a side bonded to nitrogen is $X^1$ or $X^2$), each of $X^1$ and $X^2$ is a group represented by the following formula (1x) or (2x), and each of $Y^1$ and $Y^2$ is a group represented by any of those selected from the following formulae (1y) to (5y). In the case where each of $X^1$ and $X^2$ is a group represented by the following formula (2x), each of $Y^1$ and $Y^2$ may be a single bond, and may have an oxygen atom between carbon atoms in this case.

[Chem. 3]

(1x)

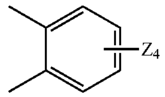

(2x)

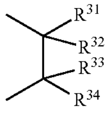

-continued (1y)

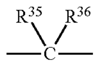

(2y)

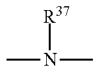

(3y)

—O—

(4y)

—S—

(5y)

—Se—

In the formula (1x), four Zs each independently represent a hydrogen atom, a hydroxyl group, an alkyl group or an alkoxy group having 1 to 6 carbon atoms, or —$NR^{38}R^{39}$ ($R^{38}$ and $R^{39}$ each independently represent a hydrogen atom or an alkyl group having 1 to 20 carbon atoms). $R^{31}$ to $R^{36}$ each independently represent a hydrogen atom, an alkyl group having 1 to 6 carbon atoms, or an aryl group having 6 to 10 carbon atoms, and $R^{37}$ represents an alkyl group having 1 to 6 carbon atoms or an aryl group having 6 to 10 carbon atoms.

$R^{21}$ to $R^{23}$ and $R^{25}$ in the case where no heterocycle is formed, $R^{27}$, $R^{28}$, $R^{29}$, and $R^{31}$ to $R^{37}$ may be bonded to any other among those to form a 5-membered ring or a 6-membered ring. $R^{31}$ and $R^{36}$, as well as $R^{31}$ and $R^{37}$ may be directly bonded.

$R^{21}$, $R^{22}$, $R^{23}$, and $R^{25}$ in the case where no heterocycle is formed each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, or an alaryl group having 7 to 18 carbon atoms which may have a substituent and may have an oxygen atom between carbon atoms.

Examples of the compound (I) include a compound represented by any one of formulae (I-1) to (I-3), and the compound represented by the formula (I-1) is particularly preferable from the viewpoint of solubility in a resin, heat resistance and light resistance in a resin, and a visible light transmittance of a resin film containing the same.

[Chem. 4]

(I-1)

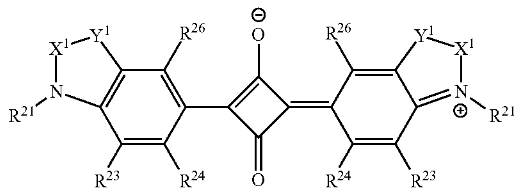

(I-2)

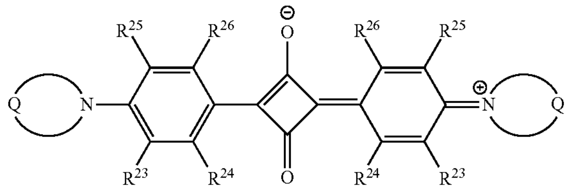

-continued (I-3)

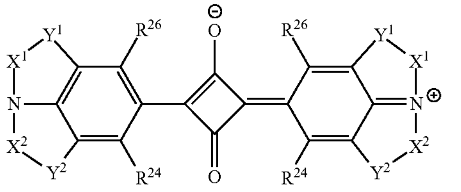

For symbols in the formulae (I-1) to (I-3), respective specifications thereof are the same as those for the same symbols in the formula (I), and preferred embodiments are also the same.

In the compound (I-1), $X^1$ is preferably a group (2x), and $Y^1$ is preferably a single bond or a group (1y). In this case, $R^{31}$ to $R^{36}$ are preferably hydrogen atoms or alkyl groups having 1 to 3 carbon atoms, and more preferably hydrogen atoms or methyl groups. Specific examples of —$Y^1$—$X^1$ include divalent organic groups represented by formulae (11-1) to (12-3).

$$—C(CH_3)_2—CH(CH_3)— \quad (11\text{-}1)$$

$$—C(CH_3)_2—CH_2— \quad (11\text{-}2)$$

$$—C(CH_3)_2—CH(C_2H_5)— \quad (11\text{-}3)$$

$$—C(CH_3)_2—C(CH_3)(nC_3H_7)— \quad (11\text{-}4)$$

$$—C(CH_3)_2—CH_2—CH_2— \quad (12\text{-}1)$$

$$—C(CH_3)_2—CH_2—CH(CH_3)— \quad (12\text{-}2)$$

$$—C(CH_3)_2—CH(CH_3)-CH_2— \quad (12\text{-}3)$$

In addition, in the compound (I-1), $R^{21}$'s are independently more preferably a group represented by a formula (4-1) or (4-2), from the viewpoint of solubility, heat resistance, and further steepness of change in the vicinity of a boundary between the visible region and the near-infrared region in the spectral transmittance curve.

[Chem. 5]

(4-1)

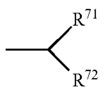

(4-2)

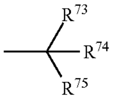

In the formulae (4-1) and (4-2), $R^{71}$ to $R^{75}$ independently represent a hydrogen atom, a halogen atom, or an alkyl group having 1 to 4 carbon atoms.

In the compound (I-1), $R^{24}$ is preferably —$NR^{27}R^{28}$. As —$NR^{27}R^{28}$, —NH—C(═O)—$R^{29}$ or —NH—$SO_2$—$R^{30}$ is preferable from the viewpoint of solubility in a resin and a coating solvent.

In the compound (I-1), a compound in which $R^{24}$ is —NH—C(═O)—$R^{29}$ is shown in a formula (I-11).

[Chem. 6]

(I-11)

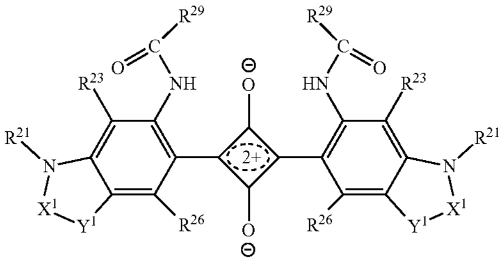

$R^{23}$ and $R^{26}$ are each independently preferably a hydrogen atom, a halogen atom, or an alkyl group or an alkoxy group having 1 to 6 carbon atoms, and both are more preferably a hydrogen atom.

$R^{29}$ is preferably an alkyl group having 1 to 20 carbon atoms which may have a substituent, an aryl group having 6 to 10 carbon atoms which may have a substituent, or an alaryl group having 7 to 18 carbon atoms which may have a substituent and may have an oxygen atom between carbon atoms. Examples of the substituent include a hydroxyl group, a carboxy group, a sulfo group, a cyano group, an alkyl group having 1 to 6 carbon atoms, a fluoroalkyl group having 1 to 6 carbon atoms, an alkoxy group having 1 to 6 carbon atoms, and an acyloxy group having 1 to 6 carbon atoms.

$R^{29}$ is preferably a group selected from a linear, branched, or cyclic alkyl group having 1 to 17 carbon atoms, a phenyl group which may be substituted with an alkoxy group having 1 to 6 carbon atoms, and an alaryl group having 7 to 18 carbon atoms which may have an oxygen atom between carbon atoms.

As $R^{29}$, a group which is a hydrocarbon group having 5 to 25 carbon atoms and having at least one or more branches can also be preferably used in which one or more hydrogen atoms may be independently substituted with a hydroxyl group, a carboxy group, a sulfo group, or a cyano group, and may have an unsaturated bond, an oxygen atom, or a saturated or unsaturated ring structure between carbon atoms.

More specific examples of the compound (I-11) include compounds shown in the following table. In addition, in the compounds shown in the following table, meanings of respective symbols are the same on the left and right sides of a squarylium skeleton.

TABLE 1

| Dye | Substituent | | | | |
|---|---|---|---|---|---|
| abbreviation | —$Y^1$—$X^1$— | $R^{21}$ | $R^{29}$ | $R^{23}$ | $R^{26}$ |
| (I-11-1) | (11-1) | —$CH_3$ | —$nC_8H_{17}$ | H | H |
| (I-11-2) | (11-1) | —$CH_3$ | —$CH(CH_3)(nC_3H_7)$ | H | H |

TABLE 1-continued

| Dye abbreviation | Substituent —$Y^1$—$X^1$— | $R^{21}$ | $R^{29}$ | $R^{23}$ | $R^{26}$ |
|---|---|---|---|---|---|
| (I-11-3) | (11-1) | —$CH_3$ | —$CH(C_2H_5)(nC_4H_9)$ | H | H |
| (I-11-4) | (11-1) | —$CH_3$ | —$CH(nC_3H_7)_2$ | H | H |
| (1-11-5) | (11-1) | —$CH_3$ | —$C(CH_3)_2(nC_3H_7)$ | H | H |
| (I-11-6) | (11-1) | —$C_2H_5$ | —$nC_8H_{17}$ | H | H |
| (I-11-7) | (11-1) | —$C_2H_5$ | —$CH(CH_3)(nC_3H_7)$ | H | H |
| (I-11-8) | (11-1) | —$C_2H_5$ | —$CH(C_2H_5)(nC_4H_9)$ | H | H |
| (I-11-9) | (11-1) | —$C_2H_5$ | —$CH(nC_3H_7)_2$ | H | H |
| (I-11-10) | (11-1) | —$C_2H_5$ | —$C(CH_3)_2(nC_3H_7)$ | H | H |
| (I-11-11) | (11-1) | —$CH(CH_3)_2$ | —$nC_8H_{17}$ | H | H |
| (I-11-12) | (11-1) | —$CH(CH_3)_2$ | —$CH(CH_3)(nC_3H_7)$ | H | H |
| (I-11-13) | (11-1) | —$CH(CH_3)_2$ | —$CH(C_2H_5)(nC_4H_9)$ | H | H |
| (I-11-14) | (11-1) | —$CH(CH_3)_2$ | —$CH(nC_3H_7)_2$ | H | H |
| (I-11-15) | (11-1) | —$CH(CH_3)_2$ | —$C(CH_3)_2(nC_3H_7)$ | H | H |
| (I-11-16) | (11-4) | —$CH_3$ | —$nC_8H_{17}$ | H | H |
| (I-11-17) | (11-4) | —$CH_3$ | —$CH(CH_3)(nC_3H_7)$ | H | H |
| (I-11-18) | (11-4) | —$CH_3$ | —$CH(C_2H_5)(nC_4H_9)$ | H | H |
| (I-11-19) | (11-4) | —$CH_3$ | —$CH(nC_3H_7)_2$ | H | H |
| (I-11-20) | (11-4) | —$CH_3$ | —$C(CH_3)_2(nC_3H_7)$ | H | H |
| (I-11-21) | (11-4) | —$C_2H_5$ | —$nC_8H_{17}$ | H | H |
| (I-11-22) | (11-4) | —$C_2H_5$ | —$CH(CH_3)(nC_3H_7)$ | H | H |
| (I-11-23) | (11-4) | —$C_2H_5$ | —$CH(C_2H_5)(nC_4H_9)$ | H | H |
| (I-11-24) | (11-4) | —$C_2H_5$ | —$CH(nC_3H_7)_2$ | H | H |
| (I-11-25) | (11-4) | —$C_2H_5$ | —$C(CH_3)_2(nC_3H_7)$ | H | H |
| (I-11-26) | (11-4) | —$CH(CH_3)_2$ | —$nC_8H_{17}$ | H | H |
| (I-11-27) | (11-4) | —$CH(CH_3)_2$ | —$CH(CH_3)(nC_3H_7)$ | H | H |
| (I-11-28) | (11-4) | —$CH(CH_3)_2$ | —$CH(C_2H_5)(nC_4H_9)$ | H | H |
| (I-11-29) | (11-4) | —$CH(CH_3)_2$ | —$CH(nC_3H_7)_2$ | H | H |
| (I-11-30) | (11-4) | —$CH(CH_3)_2$ | —$C(CH_3)_2(nC_3H_7)$ | H | H |

Among them, compounds (I-11-11) to (I-11-15) and (I-11-26) to (I-11-30) are preferred as the compound (I-11), from the viewpoints of solubility in a resin, maximum absorption wavelength, light resistance, heat resistance, and high absorbance.

In the compound (I-1), a compound in which $R^{24}$ is —NHI—$SO_2$—$R^{30}$ is shown in a formula (I-12).

[Chem. 7]

(I-12)

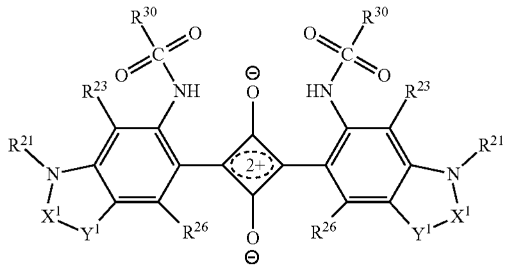

$R^{23}$ and $R^{26}$ are each independently preferably a hydrogen atom, a halogen atom, or an alkyl group or an alkoxy group having 1 to 6 carbon atoms, and both are more preferably a hydrogen atom.

From the viewpoint of light resistance, $R^{30}$ is independently preferably an alkyl group or an alkoxy group having 1 to 12 carbon atoms which may have a branch, or a hydrocarbon group having 6 to 16 carbon atoms which has an unsaturated ring structure. Examples of the unsaturated ring structure include benzene, toluene, xylene, furan, and benzofuran. $R^{30}$ is independently preferably an alkyl group or an alkoxy group having 1 to 12 carbon atoms which may have a branch. In addition, in each group representing $R^{30}$, some or all of hydrogen atoms may be substituted with halogen atoms, particularly fluorine atoms.

More specific examples of the compound (I-12) include compounds shown in the following table. In addition, in the compounds shown in the following table, meanings of respective symbols are the same on the left and right sides of a squarylium skeleton.

TABLE 2

| Dye abbreviation | Substituent —$Y^1$—$X^1$— | $R^{21}$ | $R^{30}$ | $R^{23}$ | $R^{26}$ |
|---|---|---|---|---|---|
| (I-12-1) | (11-1) | —$CH_3$ | —$nC_4H_9$ | H | H |
| (I-12-2) | (11-1) | —$CH_3$ | —$nC_8H_{17}$ | H | H |
| (I-12-3) | (11-1) | —$CH_3$ | —$CH(CH_3)(nC_3H_7)$ | H | H |
| (I-12-4) | (11-1) | —$CH_3$ | —$CH(C_2H_5)(nC_4H_9)$ | H | H |
| (I-12-5) | (11-1) | —$CH_3$ | —$CH(nC_3H_7)_2$ | H | H |
| (I-12-6) | (11-1) | —$CH_3$ | —$C(CH_3)_2(nC_3H_7)$ | H | H |
| (I-12-7) | (11-1) | —$C_2H_5$ | —$nC_4H_9$ | H | H |
| (I-12-8) | (11-1) | —$C_2H_5$ | —$nC_8H_{17}$ | H | H |

TABLE 2-continued

| Dye | Substituent | | | | |
|---|---|---|---|---|---|
| abbreviation | —$Y^1$—$X^1$— | $R^{21}$ | $R^{30}$ | $R^{23}$ | $R^{26}$ |
| (I-12-9) | (11-1) | —$C_2H_5$ | —$CH(CH_3)(nC_3H_7)$ | H | H |
| (I-12-10) | (11-1) | —$C_2H_5$ | —$CH(C_2H_5)(nC_4H_9)$ | H | H |
| (I-12-11) | (11-1) | —$C_2H_5$ | —$CH(nC_3H_7)_2$ | H | H |
| (I-12-12) | (11-1) | —$C_2H_5$ | —$C(CH_3)_2(nC_3H_7)$ | H | H |
| (I-12-13) | (11-1) | —$CH(CH_3)_2$ | —$nC_4H_9$ | H | H |
| (I-12-14) | (11-1) | —$CH(CH_3)_2$ | —$nC_8H_{17}$ | H | H |
| (I-12-15) | (11-1) | —$CH(CH_3)_2$ | —$CH(CH_3)(nC_3H_7)$ | H | H |
| (I-12-16) | (11-1) | —$CH(CH_3)_2$ | —$CH(C_2H_5)(nC_4H_9)$ | H | H |
| (I-12-17) | (11-1) | —$CH(CH_3)_2$ | —$CH(nC_3H_7)_2$ | H | H |
| (I-12-18) | (11-1) | —$CH(CH_3)_2$ | —$C(CH_3)_2(nC_3H_7)$ | H | H |
| (I-12-19) | (11-4) | —$CH_3$ | —$nC_4H_9$ | H | H |
| (I-12-20) | (11-4) | —$CH_3$ | —$nC_8H_{17}$ | H | H |
| (I-12-21) | (11-4) | —$CH_3$ | —$CH(CH_3)(nC_3H_7)$ | H | H |
| (I-12-22) | (11-4) | —$CH_3$ | —$CH(C_2H_5)(nC_4H_9)$ | H | H |
| (I-12-23) | (11-4) | —$CH_3$ | —$CH(nC_3H_7)_2$ | H | H |
| (I-12-24) | (11-4) | —$CH_3$ | —$C(CH_3)_2(nC_3H_7)$ | H | H |
| (I-12-25) | (11-4) | —$C_2H_5$ | —$nC_4H_9$ | H | H |
| (I-12-26) | (11-4) | —$C_2H_5$ | —$nC_8H_{17}$ | H | H |
| (I-12-27) | (11-4) | —$C_2H_5$ | —$CH(CH_3)(nC_3H_7)$ | H | H |
| (I-12-28) | (11-4) | —$C_2H_5$ | —$CH(C_2H_5)(nC_4H_9)$ | H | H |
| (I-12-29) | (11-4) | —$C_2H_5$ | —$CH(nC_3H_7)_2$ | H | H |
| (I-12-30) | (11-4) | —$C_2H_5$ | —$C(CH_3)_2(nC_3H_7)$ | H | H |
| (I-12-31) | (11-4) | —$CH(CH_3)_2$ | —$nC_4H_9$ | H | H |
| (I-12-32) | (11-4) | —$CH(CH_3)_2$ | —$nC_8H_{17}$ | H | H |
| (I-12-33) | (11-4) | —$CH(CH_3)_2$ | —$CH(CH_3)(nC_3H_7)$ | H | H |
| (I-12-34) | (11-4) | —$CH(CH_3)_2$ | —$CH(C_2H_5)(nC_4H_9)$ | H | H |
| (I-12-35) | (11-4) | —$CH(CH_3)_2$ | —$CH(nC_3H_7)_2$ | H | H |
| (I-12-36) | (11-4) | —$CH(CH_3)_2$ | —$C(CH_3)_2(nC_3H_7)$ | H | H |

Among them, compounds (I-12-19) to (I-12-36) are preferred as the compound (I-12) from the viewpoint of transmissivity in the visible light region and solubility in the resin.

As the compound (TB), a compound represented by the following formula (II) which is a squarylium dye is particularly preferred.

<Squarylium Compound (II)>

[Chem. 8]

(II)

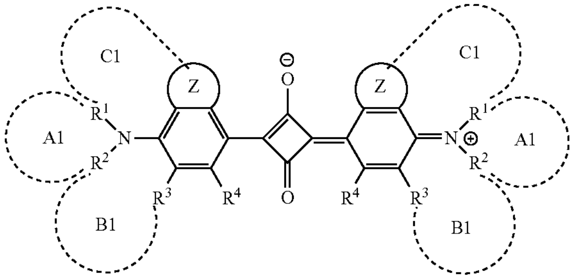

Here, symbols in the above-described formula are as follows.

Each ring Z is independently a 5-membered ring or a 6-membered ring having 0 to 3 heteroatoms in the ring, and a hydrogen atom of the ring Z may be substituted.

Carbon atoms or heteroatoms constituting $R^1$ and $R^2$, $R^2$ and $R^3$, as well as $R^1$ and the ring Z may be linked to each other to respectively form a heterocyclic ring A1, a heterocyclic ring B1, and a heterocyclic ring C1 together with a nitrogen atom, and in this case, the hydrogen atoms of the heterocyclic ring A1, the heterocyclic ring B1, and the heterocyclic ring C1 may be substituted. $R^1$ and $R^2$ in the case where no heterocyclic ring is formed each independently represent a hydrogen atom, a halogen atom, or a hydrocarbon group which may have an unsaturated bond, a heteroatom, a saturated or unsaturated ring structure between carbon atoms and may have a substituent. $R^3$ in the case where no heterocyclic ring is formed and $R^4$ each independently represent a hydrogen atom, a halogen atom, or an alkyl group or an alkoxy group which may have a heteroatom between carbon atoms and may have a substituent.

Examples of the compound (II) include a compound represented by any one of formulae (II-1) to (II-3), and a compound represented by the formula (II-3) is particularly preferable from the viewpoint of solubility in a resin and visible light transmissivity in a resin.

[Chem. 9]

(II-1)

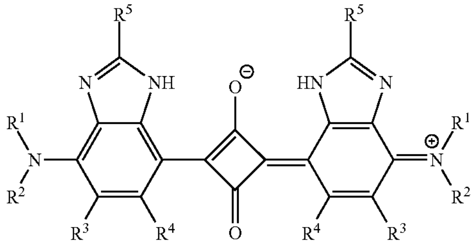

(II-2)

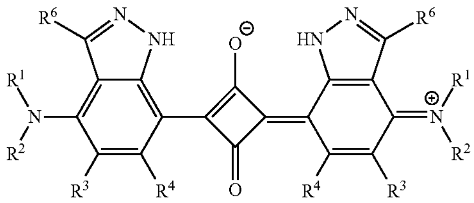

-continued (II-3)

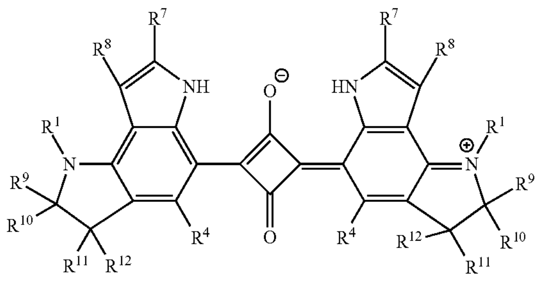

In the formulae (II-1) and (II-2), $R^1$ and $R^2$ each independently represent a hydrogen atom, a halogen atom, or an alkyl group having 1 to 15 carbon atoms which may have a substituent, and $R^3$ to $R^6$ each independently represent a hydrogen atom, a halogen atom, or an alkyl group having 1 to 10 carbon atoms which may have a substituent.

In the formula (II-3), $R^1$, $R^4$, and $R^9$ to $R^{12}$ each independently represent a hydrogen atom, a halogen atom, or an alkyl group having 1 to 15 carbon atoms which may have a substituent, and $R^7$ and $R^8$ each independently represent a hydrogen atom, a halogen atom, or an alkyl group having 1 to 5 carbon atoms which may have a substituent.

Regarding $R^1$ and $R^2$ in the compound (II-1) and the compound (II-2), from the viewpoint of solubility in a resin, visible light transmissivity, and the like, it is preferable that $R^1$ and $R^2$ are independently an alkyl group having 1 to 15 carbon atoms, it is more preferable that $R^1$ and $R^2$ are independently an alkyl group having 7 to 15 carbon atoms, it is further preferably at least one of $R^1$ and $R^2$ is an alkyl group having a branched chain having 7 to 15 carbon atoms, and it is particularly preferable that both $R^1$ and $R^2$ are alkyl groups having a branched chain and having 8 to 15 carbon atoms.

$R^1$ in the compound (II-3) is independently preferably an alkyl group having 1 to 15 carbon atoms, more preferably an alkyl group having 1 to 10 carbon atoms, and particularly preferably an ethyl group or an isopropyl group, from the viewpoint of solubility in a transparent resin, visible light transmissivity, and the like.

$R^4$ is preferably a hydrogen atom or a halogen atom, and particularly preferably a hydrogen atom, from the viewpoint of visible light transmissivity and ease of synthesis.

$R^7$ and $R^8$ are independently preferably a hydrogen atom, a halogen atom, or an alkyl group having 1 to 5 carbon atoms which may be substituted with a halogen atom, and more preferably a hydrogen atom, a halogen atom, or a methyl group.

$R^9$ to $R^{12}$ are each independently preferably a hydrogen atom, a halogen atom or an alkyl group having 1 to 5 carbon atoms which may be substituted with a halogen atom.

Examples of $—CR^9R^{10}—CR^{11}R^{12}—$ include a divalent organic group represented by one of the following groups (13-1) to (13-6).

$$—CH(CH_3)—C(CH_3)_2— \quad (13\text{-}1)$$

$$—C(CH_3)_2—CH(CH_3)— \quad (13\text{-}2)$$

$$—C(CH_3)_2—CH_2— \quad (13\text{-}3)$$

-continued $$—C(CH_3)_2—CH(C_2H_5)— \quad (13\text{-}4)$$

$$—CH(CH_3)—C(CH_3)(CH_2—CH(CH_3)_2)— \quad (13\text{-}5)$$

$$—CH(CH_3)—C(C_2H_5)(nC_4H_9)— \quad (13\text{-}6)$$

More specific examples of the compound (II-3) include compounds shown in the following table. In addition, in the compounds shown in the following table, meanings of respective symbols are the same on the left and right sides of a squarylium skeleton.

TABLE 3

| Dye | Substituent | | | | |
|---|---|---|---|---|---|
| abbreviation | $—CR^9R^{10}—CR^{11}R^{12}—$ | $R^1$ | $R^4$ | $R^7$ | $R^8$ |
| (II-3-1) | (13-1) | $-CH_3$ | H | H | H |
| (II-3-2) | (13-1) | $-C_2H_5$ | H | H | H |
| (II-3-3) | (13-1) | $-CH(CH_3)_2$ | H | H | H |
| (II-3-4) | (13-5) | $-CH_3$ | H | H | H |
| (II-3-5) | (13-5) | $-C_2H_5$ | H | H | H |
| (II-3-6) | (13-5) | $-CH(CH_3)_2$ | H | H | H |
| (II-3-7) | (13-6) | $-CH_3$ | H | H | H |
| (II-3-8) | (13-6) | $-C_2H_5$ | H | H | H |
| (II-3-9) | (13-6) | $-CH(CH_3)_2$ | H | H | H |

Squarylium compounds (I) and (II) can each be produced by a known method. The compound (I) can be produced by methods disclosed in U.S. Pat. No. 5,543,086, U.S. Patent Application Publication No. 2014/0061505, and WO2014/088063. The compound (II) can be produced by a method disclosed in WO2017/135359.

As the compound (IC), a compound represented by the following formula (III) which is a cyanine dye is particularly preferred.

<Cyanine Compound (III)>

[Chem. 10]

(III)

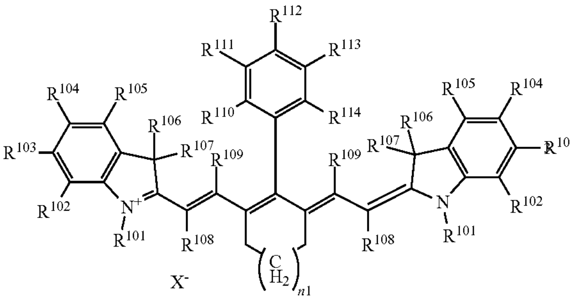

Here, symbols in the above-described formula are as follows.

$R^{101}$ to $R^{109}$ each independently represent a hydrogen atom, a halogen atom, an alkyl group having 1 to 15 carbon atoms which may have a substituent, or an aryl group having 5 to 20 carbon atoms. $R^{110}$ to $R^{114}$ each independently represent a hydrogen atom, a halogen atom, or an alkyl group having 1 to 15 carbon atoms.

$X^-$ represents a monovalent anion.

The Symbol n1 is 0 or 1. A hydrogen atom bonded to a carbon ring containing $—(CH_2)_{n1}—$ may be substituted with a halogen atom, an alkyl group having 1 to 15 carbon atoms or an aryl group having 5 to 20 carbon atoms which may have a substituent.

In the above description, the alkyl group (including the alkyl group of the alkoxy group) may be a linear chain, or may have a branched structure or a saturated ring structure. The aryl group refers to a group bonded via a carbon atom constituting an aromatic ring of an aromatic compound, for example, a benzene ring, a naphthalene ring, a biphenyl, a furan ring, a thiophene ring, a pyrrole ring, or the like. Examples of the substituent in the alkyl group or alkoxy group having 1 to 15 carbon atoms which may have a substituent, and the aryl group having 5 to 20 carbon atoms include a halogen atom and an alkoxy group having 1 to 10 carbon atoms.

In the formula (III), $R^{101}$ is preferably an alkyl group having 1 to 15 carbon atoms or an aryl group having 5 to 20 carbon atoms, and more preferably a branched alkyl group having 1 to 15 carbon atoms from the viewpoint of maintaining a high visible light transmittance in the resin.

In the formula (III), $R^{102}$ to $R^{105}$, $R^{108}$, and $R^{109}$ are each independently preferably a hydrogen atom, an alkyl group or an alkoxy group having 1 to 15 carbon atoms, or an aryl group having 5 to 20 carbon atoms, and more preferably a hydrogen atom from the viewpoint of obtaining a high visible light transmittance.

In the formula (III), $R^{110}$ to $R^{114}$ are each independently preferably a hydrogen atom or an alkyl group having 1 to 15 carbon atoms, and more preferably a hydrogen atom from the viewpoint of obtaining a high visible light transmittance.

$R^{106}$ and $R^{107}$ are each independently preferably a hydrogen atom, an alkyl group having 1 to 15 carbon atoms, or an aryl group having 5 to 20 carbon atoms (which may include a chain-like, cyclic, or branched alkyl group), and more preferably a hydrogen atom, or an alkyl group having 1 to 15 carbon atoms. In addition, $R^{106}$ and $R^{107}$ are preferably the same group.

Examples of $X^-$ include $I^-$, $BF_4^-$, $PF_6^-$, $ClO_4^-$, and anions represented by formulae (X1) and (X2), and $X^-$ is preferably $BF_4^-$, $PF_6^-$, $ClO_4^-$, or an anion represented by the formula (X1).

[Chem. 11]

(X1)

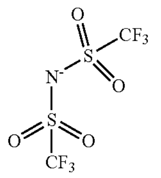

(X2)

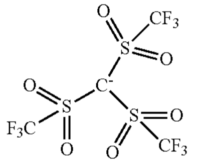

In the following description, a portion of the dye (III) excluding $R^{101}$ to $R^{114}$ is also referred to as a skeleton (III).

In the formula (III), n1 is preferably 1 from the viewpoint that the region of maximum absorption wavelength is approximately in a range of 760 nm to 800 nm. A compound in which n1 is 1 in the formula (III) is shown in the following formula (III-1).

[Chem. 12]

(III-1)

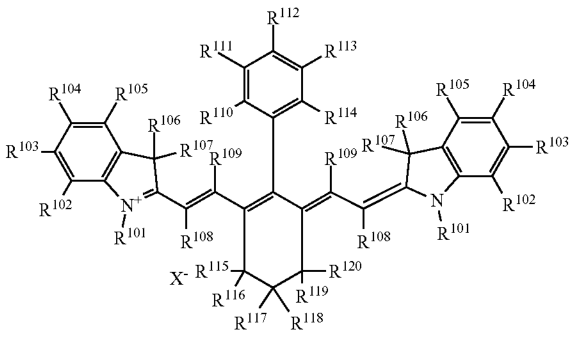

In the formula (III-1), $R^{101}$ to $R^{11}4$ and $X^-$ are the same as those in the formula (III). $R^{115}$ to $R^{120}$ each independently represents a hydrogen atom, a halogen atom, an alkyl group or alkoxy group having 1 to 15 carbon atoms which may have a substituent, or an aryl group having 5 to 20 carbon atoms. $R^{115}$ to $R^{120}$ are each independently preferably a hydrogen atom, an alkyl group having 1 to 15 carbon atoms, or an aryl group having 5 to 20 carbon atoms (which may include a chain-like, cyclic, or branched alkyl group), and more preferably a hydrogen atom, or an alkyl group having 1 to 15 carbon atoms. In addition, $R^{115}$ to $R^{120}$ are preferably the same group.

Specific examples of the compound represented by the formula (III-1) include compounds in which an atom or group bonded to each skeleton is an atom or group shown in the following table. In all the compounds shown in the following table, $R^{101}$ to $R^{109}$ are all the same on the left and right sides of the formulae.

$R^{110}$ to $R^{114}$ in the following table represent an atom or a group bonded to a benzene ring at the center of each formula, and are described as "H" when all of the five are hydrogen atoms. In the case where any of $R^{110}$ to $R^{114}$ is a substituent and the others are hydrogen atoms, only a combination of a symbol representing the substituent and the substituent is described. For example, the description of "$R^{112}$—$C(CH_3)_3$" indicates that $R^{112}$ represents —$C(CH_3)_3$ and the others are hydrogen atoms.

In the following table, $R^{115}$ to $R^{120}$ each represent an atom or a group bonded to a center cyclohexane ring in the formula (III-1), and are described as "H" when all the six are hydrogen atoms. In the case where any of $R^{115}$ to $R^{120}$ is a substituent and the others are hydrogen atoms, only a combination of a symbol representing the substituent and the substituent is described.

Although $X^-$ is not shown in the table below, $X^-$ is $BF_4^-$, $PF^-$, $ClO_4^-$, or an anion represented by the formula (X1) in any compound.

TABLE 4

| Dye | Substituent | | | | | | | | | |
|---|---|---|---|---|---|---|---|---|---|---|
| abbreviation | $R^{101}$ | $R^{102}$ | $R^{103}$ | $R^{104}$ | $R^{105}$ | $R^{106}$ | $R^{107}$ | $R^{108}$ | $R^{109}$ | $R^{110}$-$R^{114}$ | $R^{115}$-$R^{120}$ |
| (III-1-1) | $-CH_3$ | H | H | H | H | $-CH_3$ | $-CH_3$ | H | H | H | H |
| (III-1-2) | $-CH_2CH_3$ | H | H | H | H | $-CH_3$ | $-CH_3$ | H | H | H | H |
| (III-1-3) | $-CH(CH_3)_2$ | H | H | H | H | $-CH_3$ | $-CH_3$ | H | H | H | H |
| (III-1-4) | $-nC_3H_7$ | H | H | H | H | $-CH_3$ | $-CH_3$ | H | H | H | H |
| (III-1-5) | $-nC_4H_9$ | H | H | H | H | $-CH_3$ | $-CH_3$ | H | H | H | H |
| (III-1-6) | $-CH_3$ | H | H | H | H | H | H | H | H | H | H |
| (III-1-7) | $-CH_2CH_3$ | H | H | H | H | H | H | H | H | H | H |
| (III-1-8) | $-CH(CH_3)_2$ | H | H | H | H | H | H | H | H | H | H |
| (III-1-9) | $-nC_3H_7$ | H | H | H | H | H | H | H | H | H | H |
| (III-1-10) | $-nC_4H_9$ | H | H | H | H | H | H | H | H | H | H |

Among the dye (III-1), dyes (III-1-1) to (II-1-5) are preferred, from the viewpoint of transmissivity in the visible light region and solubility in the resin.

The dye (III) can be produced, for example, by methods described in Dyes and pigments 73(2007) 344-352 and J. Heterocyclic chem, 42,959(2005).

A content of the NIR dye (I) in the resin film is preferably 15 mass % or less, and more preferably 13 mass % or less. In particular, when three or more the NIR dyes (I) are combined, the near-infrared light of 700 nm to 800 nm can be sufficiently absorbed even when the content of the dye compound is small. Therefore, there is no need to add excessively, and a decrease in a visible light transmittance can be prevented. The content of the NIR dye (I) in the resin film is preferably 0.1 mass % or more. In the case where two or more compounds are combined, the above-mentioned content is a sum of respective compounds.

<Other Dyes>

The resin film may contain other dyes, for example, a UV dye, in addition to the NIR dye.

Specific examples of the UV dye include an oxazole dye, a merocyanine dye, a cyanine dye, a naphthalimide dye, an oxadiazole dye, an oxazine dye, an oxazolidine dye, a naphthalate dye, a styryl dye, an anthracene dye, a cyclic carbonyl dye, and a triazole dye. The UV dye may be used alone or in combination of two or more kinds thereof.

<Substrate Configuration>

The substrate in the present filter may have a single-layer structure or a multiple-layer structure. A material of the substrate may be an organic material or an inorganic material as long as the material is a transparent material that transmits a visible light, and is not particularly limited.

When the substrate has a single-layer structure, a resin substrate formed of a resin film containing a resin and the NIR dye (I) is preferred.

In the case where the substrate has a multiple-layer structure, a composite substrate in which a resin film containing the NIR dye (I) is laid on or above at least one main surface of a support is preferred. At this time, the support is preferably made of a transparent resin or a transparent inorganic material.

The resin is not limited as long as it is a transparent resin, and one or more transparent resins selected from a polyester resin, an acrylic resin, an epoxy resin, an ene-thiol resin, a polycarbonate resin, a polyether resin, a polyarylate resin, a polysulfone resin, a polyethersulfone resin, a poly(p-phenylene) resin, a polyarylene ether phosphine oxide resin, a polyamide resin, a polyimide resin, a polyamide-imide resin, a polyolefin resin, a cyclic olefin resin, a polyurethane resin, a polystyrene resin, and the like are used. These resins may be used alone, or may be used by mixing two or more kinds thereof.

From the viewpoint of heat resistance, a glass transition point (Tg) of the resin is preferably 200° C. or higher.

From the viewpoint of spectral characteristics, a glass transition point (Tg), and adhesion of the resin film, one or more resins selected from a polyimide resin, a polycarbonate resin, a polyester resin, and an acrylic resin are preferable.

In the case where a plurality of compounds are used as the NIR dye (I) or other dyes, those compounds may be contained in the same resin film or may be contained in different resin films.

The transparent inorganic material that can be used for the support is preferably glass or a crystalline material.

Examples of the glass include an absorption type glass (near-infrared ray absorption glass) containing copper ions in a fluorophosphate glass, a phosphate glass, or the like, a soda-lime glass, a borosilicate glass, a non-alkali glass, and a quartz glass.

As the glass, a chemically strengthened glass which is obtained by exchanging alkali metal ions (for example, Li ions and Na ions) having a small ionic radius and present on a major surface of a glass plate with alkali ions having a larger ionic radius (for example, Na ions or K ions with respect to Li ions and K ions with respect to Na ions) by ion exchange at a temperature equal to or lower than a glass transition point may be used.

Examples of the crystalline material include birefringence crystals such as quartz, lithium niobate, and sapphire.

The support is preferably made of an inorganic material, and particularly preferably made of a glass or sapphire, from the viewpoint of shape stability related to long-term reliability such as spectral characteristics and mechanical characteristics, and from the viewpoint of a handling ability during filter production.

The resin film can be formed by dissolving or dispersing the dye (1), a resin or raw material components of the resin, and respective components blended as necessary in a solvent to prepare a coating solution, applying the coating solution to a support, drying the coating solution, and further curing the coating solution as necessary. The support may be a support included in the present filter, or may be a peelable support used only when a resin film is formed. Further, the solvent may be a dispersion medium capable of stably dispersing or a solvent capable of dissolving.

The coating solution may contain a surfactant in order to improve voids due to fine bubbles, depressions due to adhesion of foreign substances and the like, and repelling in a drying process. Further, for the application of the coating solution, for example, a dip coating method, a cast coating method, or a spin coating method can be used. The above-described coating solution is applied onto the support and then dried to form a resin film. Further, in the case where the coating solution contains a raw material component of the transparent resin, a curing process such as thermal curing or photocuring is further performed.

The resin film can also be produced into a film shape by extrusion molding. In the case where the substrate has the single-layer structure (is a resin substrate) formed of the resin film containing the dye (1), the resin film can be used as the substrate as it is. In the case where the substrate has the multiple-layer structure (is a composite substrate) including the support and the resin film, the substrate can be produced by laying the film on the support and integrating the film by thermocompression bonding or the like.

In order to produce the substrate including the dielectric multilayer film (B) between the support and the resin film, the dielectric multilayer film (B) is laid on or above one main surface of the support, and the resin film is further laid on or above the dielectric multilayer film (B).

The optical filter may have one layer of the resin film, or may have two or more layers of the resin film. In the case where the optical filter has two or more layers of the resin film, respective layers may have the same configuration or different configurations.

In the case where the substrate has a single-layer structure (is a resin substrate) formed of a resin film, a thickness of the resin film is preferably 20 μm to 150 μm.

In the case where the substrate has a multiple-layer structure (is a composite substrate) including the support and the resin film, a thickness of the resin film is preferably 0.3 μm to 3 μm. In the case where the optical filter has two or more layers of the resin film, a total thickness of the resin films is preferably within the above range.

A shape of the substrate is not particularly limited, and may be a block shape, a plate shape, or a film shape.

A thickness of the substrate is preferably 50 μm to 300 μm from the viewpoint of reducing warpage during formation of the dielectric multilayer film and reducing the height of the optical element.

The present filter may include, as another component, for example, a component (layer) that provides absorption by inorganic fine particles or the like that control transmission and absorption of light in a specific wavelength region. Specific examples of the inorganic fine particles include indium tin oxides (ITO), antimony-doped tin oxides (ATO), cesium tungstate, and lanthanum boride. The ITO fine particles and the cesium tungstate fine particles have a high transmittance for visible light and have light absorbing property in a wide range of an infrared wavelength region exceeding 1,200 nm, and thus can be used in the case where a shielding property of infrared light is required.

For example, in the case where the present filter is used in an imaging device such as a digital still camera, the filter can provide an imaging device having an excellent color reproducibility. The imaging device including the present filter includes a solid state image sensor, an imaging lens, and the present filter. The present filter can be used, for example, by being disposed between the imaging lens and the solid state image sensor, or by being directly attached to the solid state image sensor, the imaging lens, or the like of the imaging device via an adhesive layer.

EXAMPLES

Next, the present invention will be described more specifically with reference to examples.

For measurement of each spectral characteristic, an ultraviolet-visible spectrophotometer (UH-4150 type, manufactured by Hitachi High-Tech Corporation) was used.

The spectral characteristic in the case where an incident angle is not particularly specified is a value measured at an incident angle of 0 degrees (in a direction perpendicular to a main surface of an optical filter).

Dyes used in respective Examples are as follows.

Compound A-1 (squarylium dye): synthesized based on U.S. Pat. No. 5,543,086.

Compound B-1 (squarylium dye): synthesized based on WO2017/135359.

Compound B-2 (cyanine dye): manufactured by Few Chemical

Compound C-1 (cyanine dye): synthesized based on Dyes and Pigments 73 (2007) 344-352.

Compound D-1 (cyanine dye): synthesized based on Dyes and Pigments 73 (2007) 344-352.

Compound D-2 (squarylium dye): synthesized based on JP2020-31198A.

Compound E-1 (merocyanine dye): synthesized based on German Patent No. 10109243.

[Chem. 13]

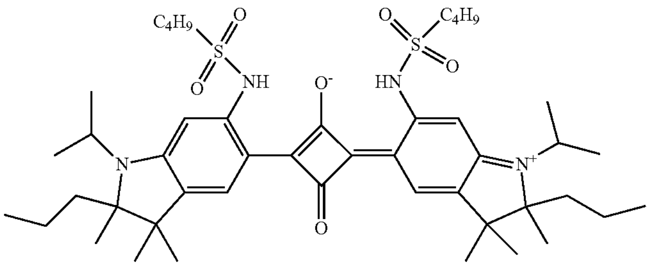

A-1

-continued
B-1
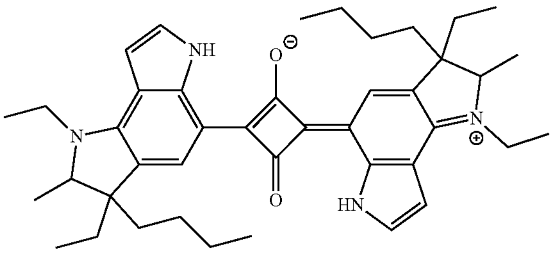
B-2
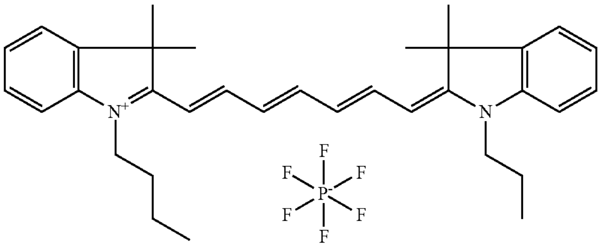
C-1
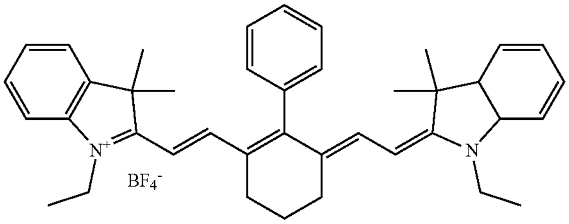
[Chem. 14]
D-1
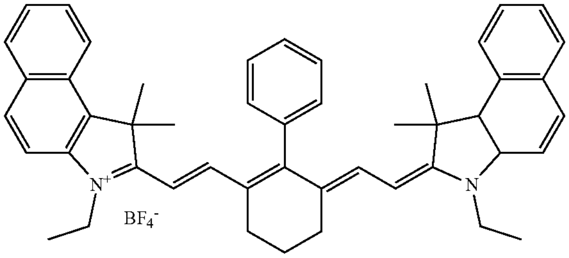
D-2
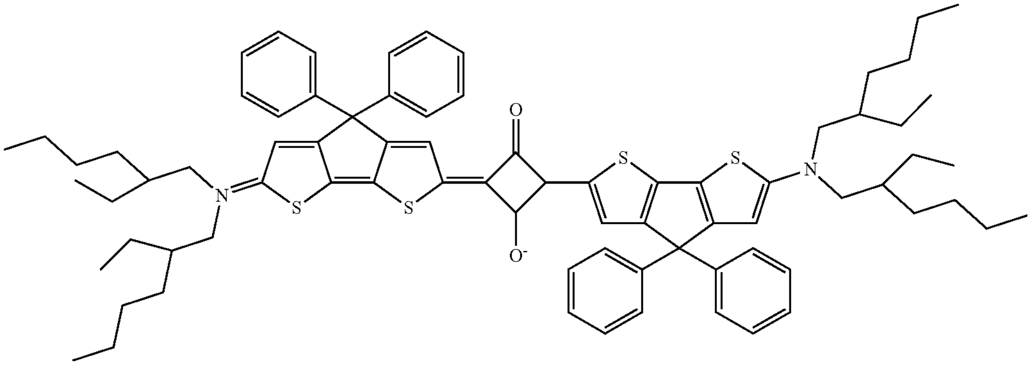

-continued

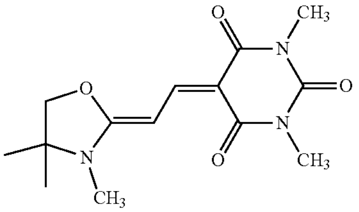

E-1

<Spectral Characteristics of TR Dye>

A polyimide resin (C-3G30G manufactured by Mitsubishi Gas Chemical Company) was dissolved in an organic solvent (cyclohexanone:γ-butyrolactone=1:1 mass ratio) at a concentration of 8.5 mass %.

Each dye compound was added to the polyimide resin solution prepared above in a content of 6 parts by mass based on 100 parts by mass of the resin, followed by stirring for 2 hours while heating to 50° C. The dye-containing resin solution was applied to a transparent glass substrate (alkali glass, D263 manufactured by Schott) and dried to obtain a resin film (coated film) having a film thickness of 1 μm.

The spectral characteristics are shown in the following table.

TABLE 5

| Dyc compound No | Maximum absorption wavelength in resin |
|---|---|
| Compound A-1 | 713 nm |
| Compound B-1 | 752 nm |
| Compound B-2 | 735 nm |
| Compound C-1 | 773 nm |
| Compound D-1 | 808 nm |
| Compound D-2 | 929 nm |
| Compound E-1 | 397 nm |

Examples 1-1 to 1-4: Spectral Characteristics of Resin Film

A polyimide resin (C-3G30G manufactured by Mitsubishi Gas Chemical Company) was dissolved in an organic solvent (cyclohexanone:γ-butyrolactone=1:1 mass ratio) at a concentration of 8.5 mass %.

Each compound was added to the polyimide resin solution prepared above in a content (mass %) shown in the following table based on 100 parts by mass of the resin, followed by stirring for 2 hours while heating to 50° C. The dye-containing resin solution was applied to a transparent glass substrate (alkali glass having a thickness of 0.2 mm, D263 manufactured by Schott) and dried to obtain a resin film (coated film) having a film thickness of 1.3 μm.

The spectral characteristics are shown in the following table.

Figure 5:
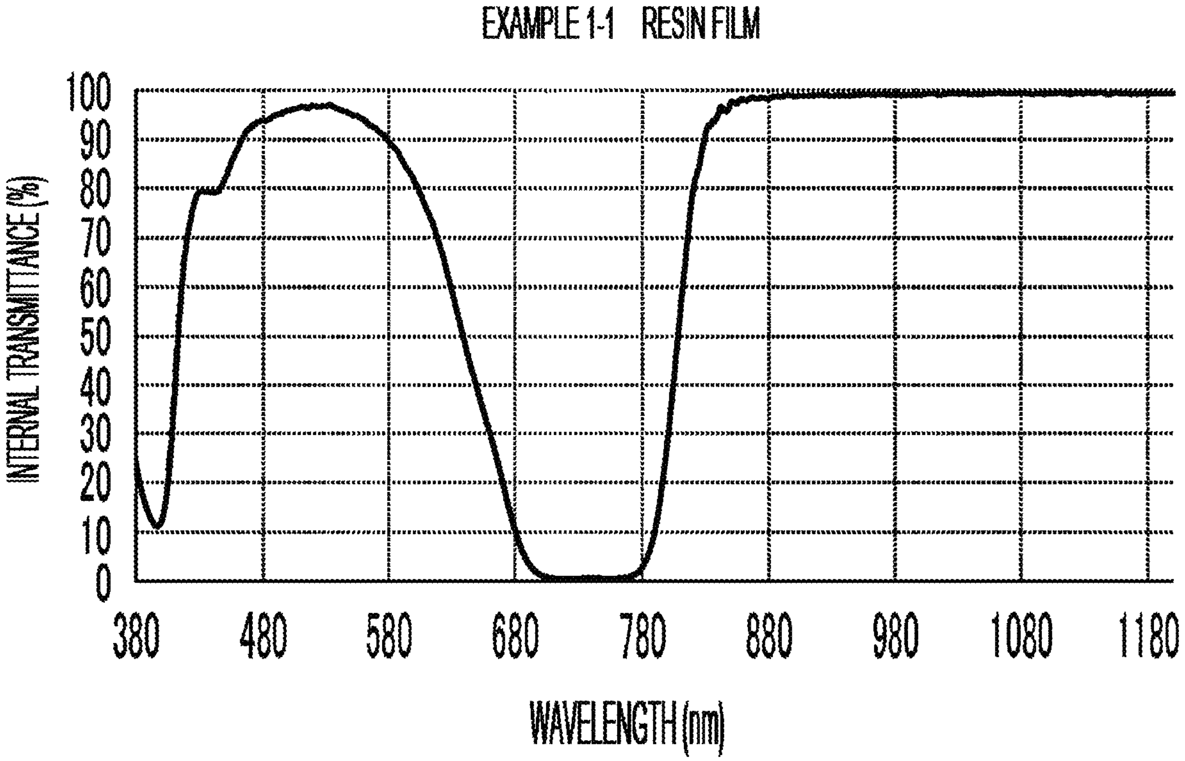
FIG. 5 is a diagram illustrating a spectral transmittance curve of a resin film in Example 1-1.

A spectral transmittance curve in Example 1-1 is shown in FIG. 5.

Examples 1-1 to 1-4 are Reference Examples.

TABLE 6

| | | | Maximum absorption wavelength (in resin) | Example 1-1 | Example 1-2 | Example 1-3 | Example 1-4 |
|---|---|---|---|---|---|---|---|
| Blending amount (mass %) | Compound (IA) | Compound A-1 | 713 nm | 4.1 | 4.6 | 4.6 | 4.1 |
| | Compound (IB) | Compound B-1 | 752 nm | 3.8 | — | — | 3.8 |
| | | Compound B-2 | 735 nm | — | — | 5.5 | — |
| | Compound (IC) | Compound C-1 | 773 nm | 3.0 | — | — | 2.3 |
| | Others | Compound D-1 | 808 nm | — | 4.6 | — | — |
| | | Compound D-2 | 929 nm | — | — | — | 2.3 |
| | | Compound E-1 | 397 nm | 3.1 | 3.1 | 3.1 | 3.1 |
| Spectral characteristics of resin film | $T_{440\text{-}600AVE}$ (%) | | | 91.9 | 91.2 | 92.3 | 86.6 |
| | IR50 (short wavelength) (nm) | | | 639 | 643 | 627 | 638 |
| | $T_{700\text{-}800AVE}$ (%) | | | 3.1 | 7.1 | 22.9 | 2.6 |
| | IR50 (long wavelength) (nm) | | | 808 | 851 | 777 | 814 |
| | $T_{840\text{-}870AVE}$ (%) | | | 97.3 | 53.2 | 99.0 | 59.6 |

In the resin film in Example 1-1, three dyes having different maximum absorption wavelengths of 700 nm to 800 nm were used, and a light in a region of 700 nm to 800 nm could be widely absorbed while maintaining a high visible light transmittance.

In the resin film in Example 1-2, a dye having a maximum absorption wavelength of 700 nm to 800 nm and a dye having a maximum absorption wavelength exceeding 800 nm were combined, and a transmittance for a light in a region of 840 nm to 870 nm, which is a sensing wavelength of the optical filter, was low.

In the resin film in Example 1-3, absorption of a light in a wavelength region of 700 nm to 800 nm to be shielded is slightly weak.

The resin film in Example 1-4 contained a dye having a maximum absorption wavelength exceeding 900 nm, and a visible light transmittance and a transmittance for a light in the region of 840 nm to 870 nm, which is the sensing wavelength of the optical filter, were low.

Examples 2-1 to 2-5: Spectral Characteristics of Dielectric Multilayer Film (A) (Reflection Layer)

$TiO_2$ and $SiO_2$ were alternately laid, by vapor deposition, on one main surface of a transparent glass substrate (alkali glass having a thickness of 0.2 mm, D263 manufactured by Schott) to form a dielectric multilayer film.

The lamination number of each dielectric film and the spectral characteristics are shown in the following table.

Figure 6:
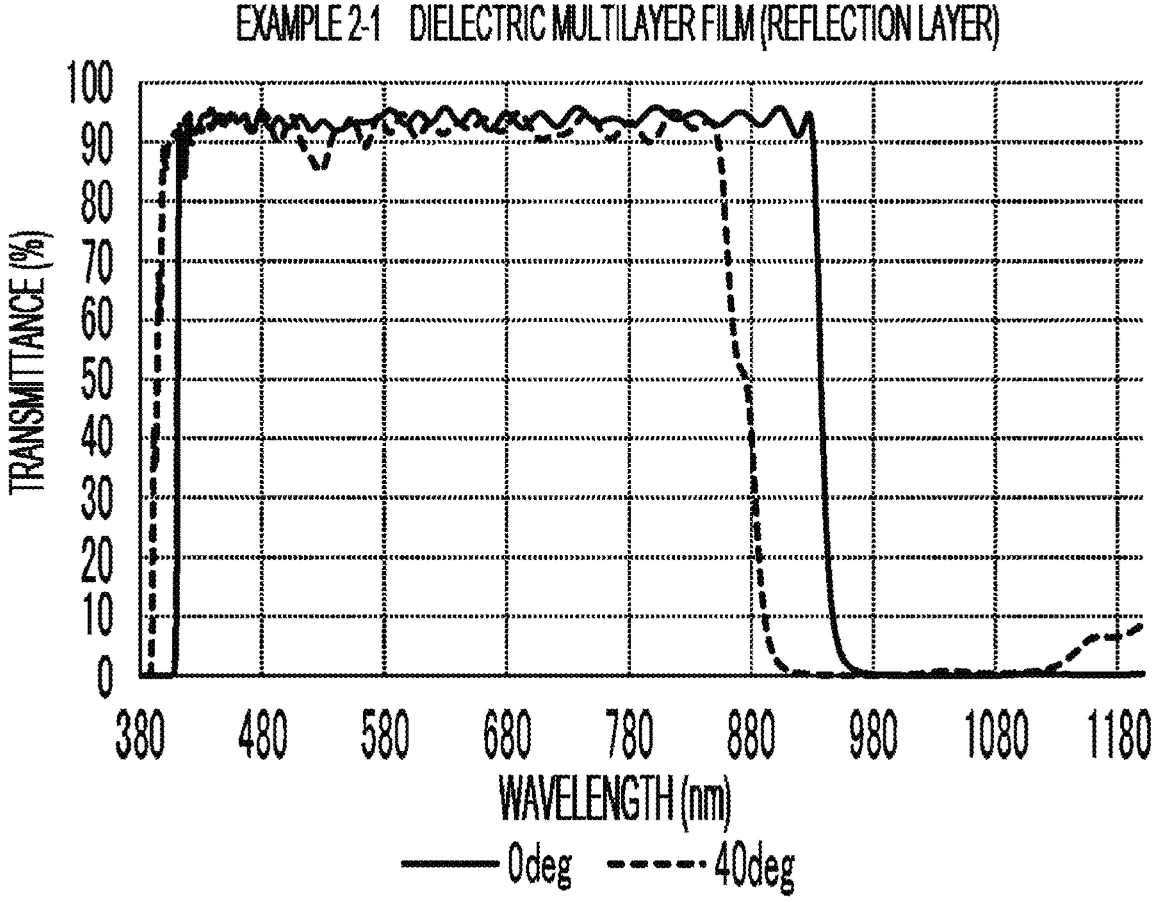
FIG. 6 is a diagram illustrating a spectral transmittance curve of a dielectric multilayer film in Example 2-1.

A spectral transmittance curve in Example 2-1 is shown in FIG. 6.

Examples 2-1 to 2-5 are Reference Examples.

TABLE 7

| | | Example 2-1 | Example 2-2 | Example 2-3 | Example 2-4 | Example 2-5 |
|---|---|---|---|---|---|---|
| | Number of layers | 52L | 42L | 52L | 52L | 52L |
| | Material | $SiO_2/TiO_2$ | $SiO_2/TiO_2$ | $SiO_2/TiO_2$ | $SiO_2/TiO_2$ | $SiO_2/TiO_2$ |
| Spectral characteristics of dielectric multilayer film (A) | $T_{440\text{-}600AVE(0deg)}$ (%) | 93.4 | 92.7 | 93.3 | 93.7 | 93.9 |
| | IR50 (nm) | 937 | 942 | 942 | 915 | 896 |
| | $T_{700\text{-}800AVE(0deg)}$ (%) | 93.9 | 1.2 | 68.5 | 93.8 | 93.1 |
| | $T_{840\text{-}870AVE(0deg)}$ (%) | 93.7 | 85.8 | 94.7 | 93.2 | 90.2 |
| | $T_{950\text{-}1200AVE(0deg)}$ (%) | 0.4 | 0.2 | 0.5 | 0.3 | 0.4 |
| | $T_{440\text{-}600AVE(40deg)}$ (%) | 91.8 | 86.0 | 91.3 | 91.4 | 91.2 |
| | $T_{810\text{-}870AVE(40deg)}$ (%) | 79.2 | 60.9 | 85.6 | 43.8 | 20.2 |
| | $T_{950\text{-}1200AVE(40deg)}$ (%) | 1.9 | 7.6 | 2.5 | 4.0 | 6.0 |
| | $\|T_{440\text{-}600AVE(0deg)} - T_{440\text{-}600AVE(40deg)}\|$ (%) | 1.6 | 6.7 | 2.0 | 2.3 | 2.7 |
| | $\|T_{840\text{-}870AVE(0deg)} - T_{840\text{-}870AVE(40deg)}\|$ (%) | 14.5 | 24.9 | 9.0 | 49.4 | 70.0 |

The dielectric multilayer film in Example 2-1 had an excellent transmissivity for a light in a visible light region and a light in a region of 840 nm to 870 nm, which is a sensing wavelength of the optical filter, at any of incident angles of 0 degrees and 40 degrees.

In the dielectric multilayer film in Example 2-2, reflection of a light in a region of 700 nm to 800 nm was strong, but a transmittance for a light in a visible light region decreased at an incident angle of 40 degrees, and ripple in the visible light region was large.

In the dielectric multilayer film in Example 2-3, a light in a region of 700 nm to 800 nm is weakly reflected.

The dielectric multilayer film in Example 2-4 is designed to have an IR50 within a range of 900 nm to 960 nm and to shift to a wavelength side shorter than that of the dielectric multilayer film in Example 2-1.

The dielectric multilayer film in Example 2-5 is designed to have an IR50 at a wavelength side shorter than 900 nm and shifts further than that in Example 2-4.

Examples 3-1 to 3-3: Spectral Characteristics of Dielectric Multilayer Film (B) (Protective Layer)

In Examples 3-1 and 3-2, $TiO_2$ and $SiO_2$ were alternately laid, by vapor deposition, on one main surface of a transparent glass substrate (alkali glass having a thickness of 0.2 mm, D263 manufactured by Schott) to form a dielectric multilayer film.

In Example 3-3, $SiO_2$ was laid, by vapor deposition, on one main surface of a transparent glass substrate (alkali glass having a thickness of 0.2 mm, D263 manufactured by Schott) to form a dielectric multilayer film.

The lamination number of each dielectric film and the spectral characteristics are shown in the following table.

Figure 7:
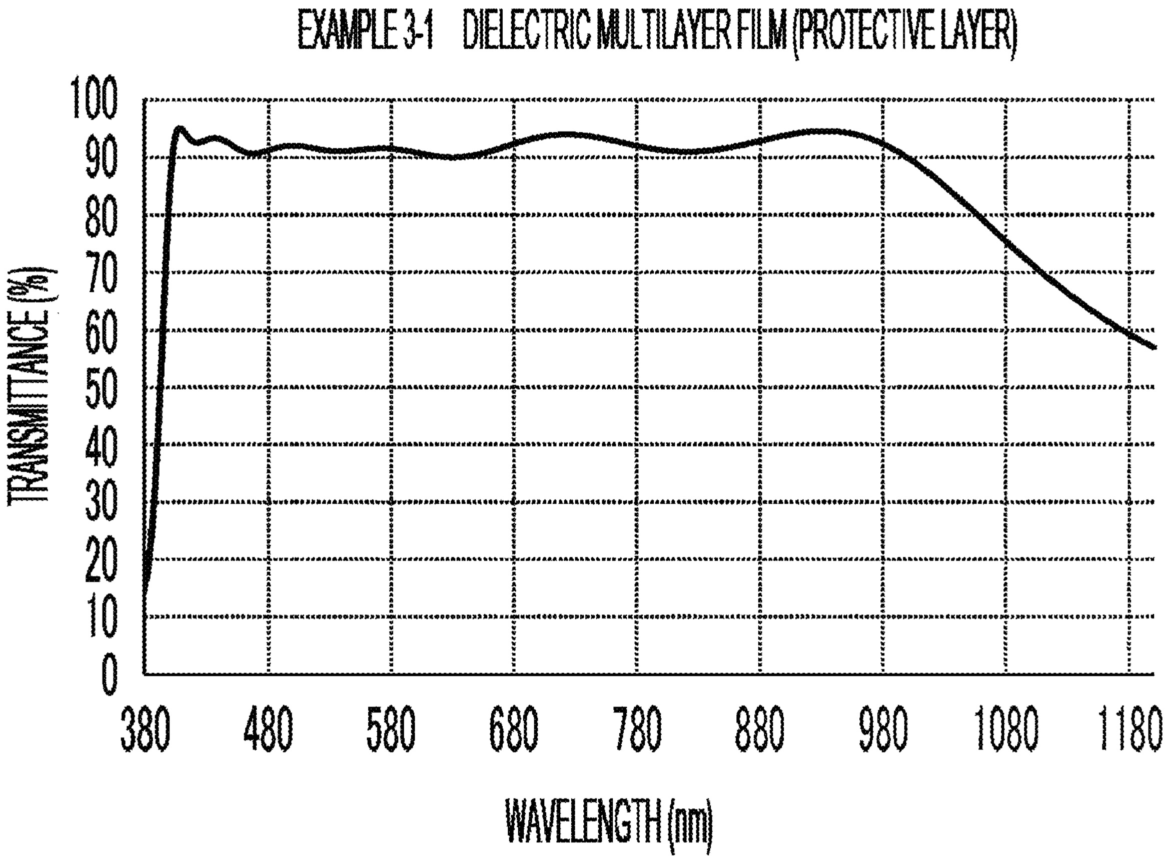
FIG. 7 is a diagram illustrating a spectral transmittance curve of a dielectric multilayer film in Example 3-1.

A spectral transmittance curve in Example 3-1 is shown in FIG. 7.

Examples 3-1 to 3-3 are Reference Examples.

TABLE 8

| | | Example 3-1 | Example 3-2 | Example 3-3 |
|---|---|---|---|---|
| Number of layers | | 11 L | 25 L | 1 L |
| Material | | $SiO_2/TiO_2$ | $SiO_2/TiO_2$ | $SiO_2$ |
| Spectral characteristics of dielectric multilayer film (B) | $T_{440\text{-}600AVE(0\ deg)}$ (%) | 91.5 | 90.3 | 92.6 |
| | $T_{880\text{-}1200AVE(0\ deg)}$ (%) | 80.3 | 68.5 | 92.6 |

The dielectric multilayer films in Examples 3-1 and 3-2 are designed to have a high transmittance for a light in a visible light region and reflect a near-infrared light of 880 nm or more.

The dielectric film in Example 3-3 is designed to have a high transmittance for a light in the visible light region and a near-infrared light of 880 nm or more.

Examples 4-1 and 4-2: Spectral Characteristics of Dielectric Multilayer Film (C) (Antireflection Layer)

$TiO_2$ and $SiO_2$ were alternately laid, by vapor deposition, on one main surface of a transparent glass substrate (alkali glass having a thickness of 0.2 mm, D263 manufactured by Schott) to form a dielectric multilayer film.

The lamination number of each dielectric film and the spectral characteristics are shown in the following table.

Figure 8:
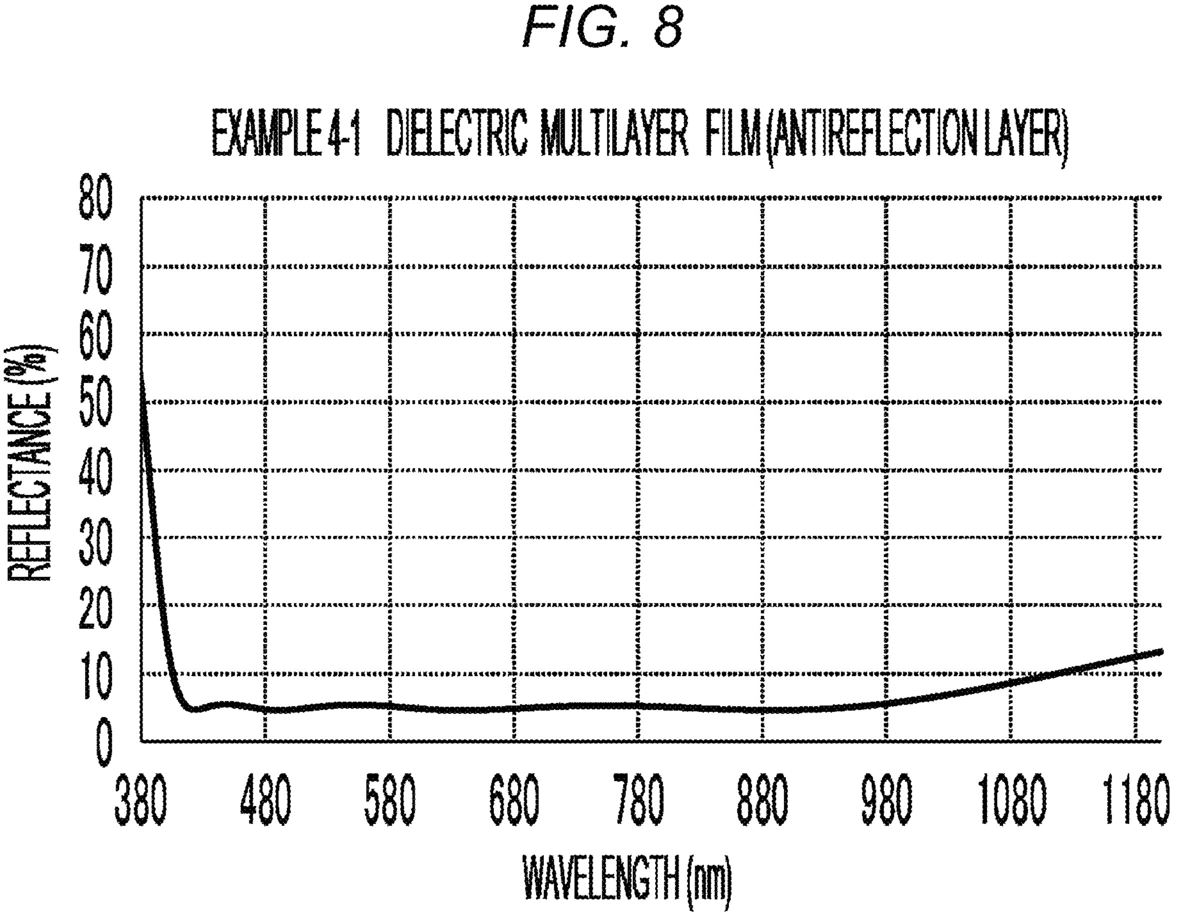
FIG. 8 is a diagram illustrating a spectral reflectance curve of a dielectric multilayer film in Example 4-1.

A spectral reflectance curve in Example 4-1 is shown in FIG. 8.

Examples 4-1 and 4-2 are Reference Examples.

TABLE 9

| | | Example 4-1 | Example 4-2 |
|---|---|---|---|
| Number of layers | | 9 L | 7 L |
| Material | | $SiO_2/TiO_2$ | $SiO_2/TiO_2$ |
| Spectral characteristics of dielectric multilayer film (C) | $R_{440\text{-}600AVE(5\ deg)}$ (%) | 5.0 | 4.4 |
| | $R_{840\text{-}870AVE(5\ deg)}$ (%) | 4.7 | 10.8 |

The dielectric multilayer film in Example 4-1 is designed such that reflection in a visible light region can be prevented and reflectance in a sensing wavelength region of the optical filter can also be kept low.

The dielectric multilayer film in Example 4-2 is designed such that reflection of a light in the visible light region can be prevented and reflectance for a light in the sensing wavelength region of the optical filter is higher than that in Example 4-1.

Examples 5-1 to 5-11: Spectral Characteristics of Optical Filter

The dielectric multilayer film (A) (a reflection layer) was formed on one main surface of a transparent glass substrate (alkali glass having a thickness of 0.2 mm, D263 manufactured by Schott) by vapor deposition under conditions described in any one of Examples 2-1 to 2-5.

Next, the dielectric multilayer film (B) (a protective layer) was formed on the other main surface of the transparent glass substrate by vapor deposition under conditions described in any one of Examples 3-1 to 3-3.

On the surface of the dielectric multilayer film (B), the resin film produced in any one of Examples 1-1 to 1-4 was formed by spin coating to have a film thickness of 1.3 km.

The dielectric multilayer film (C) (an antireflection layer) was formed on the surface of the resin film by vapor deposition under conditions described in any one of Examples 4-1 to 4-2.

For the optical filter obtained as described above, spectral transmittance curves at incident angles of 0 degrees and 40 degrees and a spectral reflectance curve at an incident angle of 5 degrees were measured. When measuring the reflectance, a dielectric multilayer film (A) (reflection layer) side was set as an incident direction.

The spectral characteristics are shown in the following table.

Figure 9:
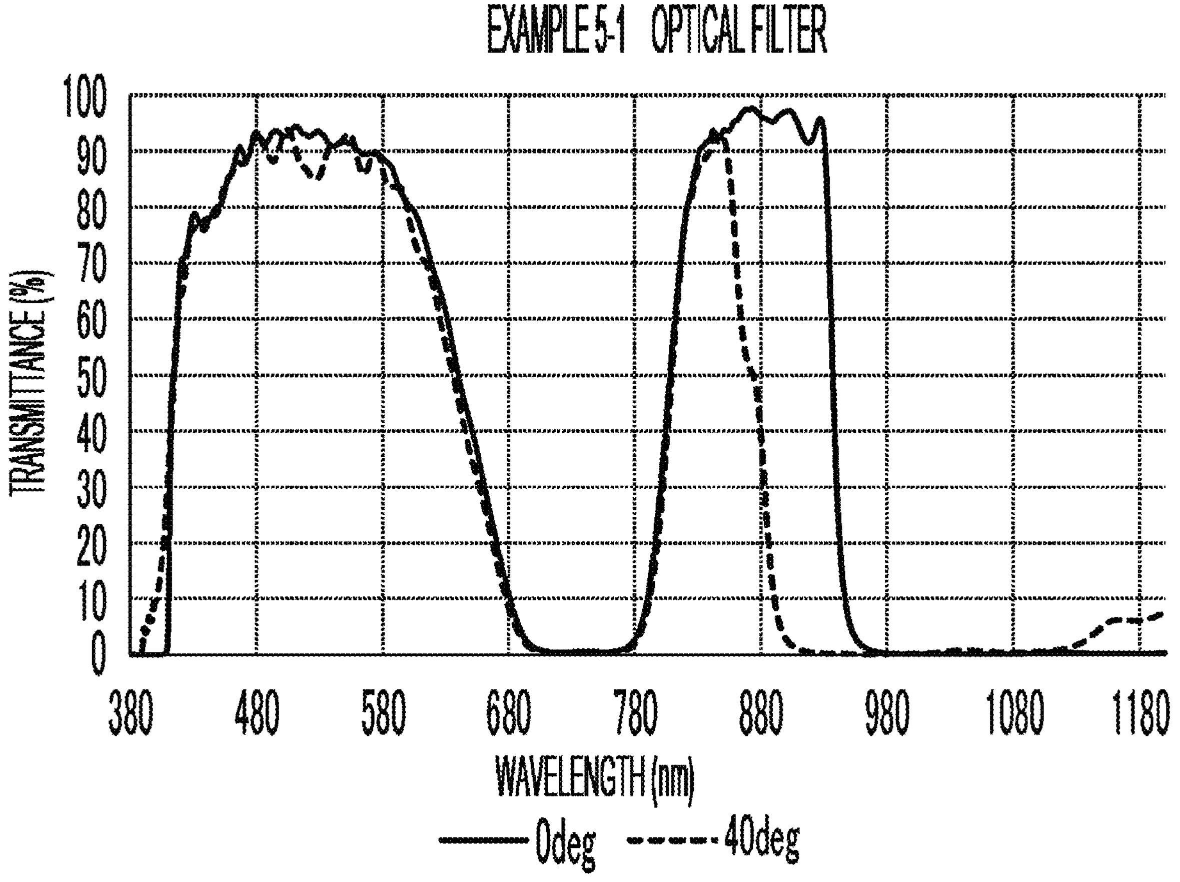
FIG. 9 is a diagram illustrating a spectral transmittance curve of an optical filter in Example 5-1.

A spectral transmittance curve of the optical filter in Example 5-1 is shown in FIG. 9.

Examples 5-1, 5-4 to 5-6, and 5-8 are Inventive Examples, and Examples 5-1, 5-3, 5-7, 5-9 to 5-11 are Comparative Examples.

TABLE 10

| | | Example 5-1 | Example 5-2 | Example 5-3 | Example 5-4 | Example 5-5 |
|---|---|---|---|---|---|---|
| Configuration of optical filter | Dielectric multilayer film A (reflection layer) | Example 2-1 | Example 2-4 | Example 2-5 | Example 2-1 | Example 2-3 |
| | Support | Glass | Glass | Glass | Glass | Glass |
| | Dielectric multilayer film B (protective layer) | Example 3-1 | Example 3-1 | Example 3-1 | Example 3-1 | Example 3-2 |
| | Resin film | Example 1-1 | Example 1-1 | Example 1-1 | Example 1-1 | Example 1-1 |
| | Dielectric multilayer film C (antireflection layer) | Example 4-1 | Example 4-1 | Example 4-1 | Example 4-2 | Example 4-1 |
| Spectral characteristics of optical filter | IR50(R) (nm) | 936 | 914 | 895 | 936 | 941 |
| | IR50(L) (nm) | 808 | 808 | 809 | 809 | 814 |
| | IR50(S) (nm) | 640 | 641 | 641 | 640 | 639 |
| | \|IR50(R) − IR50(L)\| (nm) | 128 | 106 | 86 | 127 | 127 |
| | $T_{440\text{-}600(0deg)AVE}$ (%) | 89.29 | 89.62 | 89.82 | 89.95 | 88.95 |
| | $T_{700\text{-}800(0deg)AVE}$ (%) | 3.10 | 3.10 | 3.03 | 3.08 | 2.33 |
| | $T_{840\text{-}870(0deg)AVE}$ (%) | 94.56 | 94.07 | 90.82 | 87.57 | 93.66 |
| | $T_{950\text{-}1200(0deg)AVE}$ (%) | 0.35 | 0.27 | 0.44 | 0.35 | 0.46 |
| | $T_{840\text{-}870(0deg)MAX}$ (%) | 97.44 | 97.34 | 96.80 | 89.89 | 96.96 |
| | $T_{440\text{-}600(40deg)AVE}$ (%) | 87.6 | 87.2 | 86.9 | 87.8 | 86.8 |
| | $T_{700\text{-}800(40deg)AVE}$ (%) | 2.4 | 2.4 | 2.4 | 2.3 | 2.3 |
| | $T_{840\text{-}870(40deg)AVE}$ (%) | 78.7 | 43.0 | 19.6 | 72.5 | 86.0 |
| | $T_{950\text{-}1200(40deg)AVE}$ (%) | 1.8 | 3.7 | 5.4 | 1.8 | 2.0 |
| | $T_{840\text{-}870(40deg)\ MAX}$ (%) | 92.4 | 62.4 | 38.7 | 87.8 | 96.3 |
| | $R_{700\text{-}800(5deg)AVE}$ (%) | 3.2 | 3.4 | 4.1 | 1.5 | 29.8 |
| | $\|IR50_{\_620\text{-}680(0deg)}$ − $IR50_{\_620\text{-}680(40deg)}\|$ (nm) | 4 | 6 | 6 | 4 | 4 |
| | $\|IR50_{\_780\text{-}850(0deg)}$ − $IR50_{\_780\text{-}850(40deg)}\|$ (nm) | 1 | 2 | None | 2 | 4 |

TABLE 10-continued

| | | | | | | |
|---|---|---|---|---|---|---|
| | $\lvert T_{840\text{-}870AVE(0deg)} - T_{840\text{-}870AVE(40deg)} \rvert$ (%) | 15.8 | 51.1 | 71.2 | 15.1 | 7.6 |
| | $\lvert T_{440\text{-}600AVE(0deg)} - T_{440\text{-}600AVE(40deg)} \rvert$ (%) | 1.73 | 2.43 | 2.91 | 2.19 | 2.12 |

| | | Example 5-6 | Example 5-7 | Example 5-8 | Example 5-9 | Example 5-10 | Example 5-11 |
|---|---|---|---|---|---|---|---|
| Configuration of optical filter | Dielectric multilayer film A (reflection layer) | Example 2-3 | Example 2-2 | Example 2-3 | Example 2-1 | Example 2-1 | Example 2-1 |
| | Support | Glass | Glass | Glass | Glass | Glass | Glass |
| | Dielectric multilayer film B (protective layer) | Example 3-3 | Example 3-1 | Example 3-1 | Example 3-1 | Example 3-1 | Example 3-1 |
| | Resin film | Example 1-1 | Example 1-1 | Example 1-1 | Example 1-2 | Example 1-3 | Example 1-4 |
| | Dielectric multilayer film C (antireflection layer) | Example 4-1 | Example 4-1 | Example 4-1 | Example 4-1 | Example 4-1 | Example 4-1 |
| Spectral characteristics of optical filter | IR50(R) (nm) | 936 | 921 | 941 | 936 | 936 | 936 |
| | IR50(L) (nm) | 808 | 841 | 814 | 852 | 777 | 814 |
| | IR50(S) (nm) | 640 | 638 | 640 | 623 | 604 | 615 |
| | \|IR50(R) − IR50(L)\| (nm) | 128 | 80 | 127 | 84 | 159 | 122 |
| | $T_{440\text{-}600(0deg)AVE}$ (%) | 89.21 | 88.58 | 89.25 | 88.64 | 89.63 | 84.85 |
| | $T_{700\text{-}800(0deg)AVE}$ (%) | 3.13 | 0.05 | 2.32 | 6.99 | 22.54 | 2.67 |
| | $T_{840\text{-}870(0deg)AVE}$ (%) | 94.38 | 86.55 | 95.53 | 52.91 | 95.90 | 59.25 |
| | $T_{950\text{-}1200(0deg)AVE}$ (%) | 0.35 | 0.19 | 0.46 | 0.35 | 0.35 | 0.23 |
| | $T_{840\text{-}870(0deg)MAX}$ (%) | 97.22 | 98.44 | 98.05 | 80.97 | 97.40 | 65.14 |
| | $T_{440\text{-}600(40deg)AVE}$ (%) | 87.4 | 81.8 | 87.0 | 86.9 | 87.9 | 82.8 |
| | $T_{700\text{-}800(40deg)AVE}$ (%) | 2.4 | 1.5 | 2.4 | 5.5 | 21.0 | 2.1 |
| | $T_{840\text{-}870(40deg)AVE}$ (%) | 79.3 | 60.1 | 85.5 | 39.0 | 79.9 | 47.8 |
| | $T_{950\text{-}1200(40deg)AVE}$ (%) | 1.9 | 6.0 | 2.1 | 1.8 | 1.9 | 1.8 |
| | $T_{840\text{-}870(40deg)\ MAX}$ (%) | 93.3 | 86.6 | 95.0 | 50.6 | 96.2 | 61.9 |
| | $R_{700\text{-}800(5deg)AVE}$ (%) | 2.4 | 98.9 | 30.2 | 3.0 | 3.5 | 3.2 |
| | $\lvert IR50_{\_620\text{-}680(0deg)} - IR50_{\_620\text{-}680(40deg)} \rvert$ (nm) | 4 | 26 | 5 | 17 | 19 | 19 |
| | $\lvert IR50_{\_780\text{-}850(0deg)} - IR50_{\_780\text{-}850(40deg)} \rvert$ (nm) | 1 | 31 | 5 | 2 | 98 | 42 |
| | $\lvert T_{840\text{-}870AVE(0deg)} - T_{840\text{-}870AVE(40deg)} \rvert$ (%) | 15.1 | 26.5 | 10.1 | 13.9 | 16.0 | 11.4 |
| | $\lvert T_{440\text{-}600AVE(0deg)} - T_{440\text{-}600AVE(40deg)} \rvert$ (%) | 1.77 | 6.79 | 2.23 | 1.75 | 1.71 | 2.07 |

It was shown from the above results that, in the optical filters in Examples 5-1, 5-4, 5-5, and 5-6, the average transmittance $T_{440\text{-}600(0\ deg)\ AVE}$ and the average transmittance $T_{840\text{-}870\ (0\ deg)AVE}$ were high, and thus the transmissivity for a visible light and near-infrared light of 840 nm to 870 nm was excellent; the average transmittance $T_{840\text{-}870(40\ deg)AVE}$ was high, and thus the transmissivity for a near-infrared light of 840 nm to 870 nm was excellent even at a high incident angle; the $T_{950\text{-}1200\ (0\ deg)AVE}$ was small, and thus the shielding property for a near-infrared light of 950 nm to 1200 nm was excellent; and the difference between $IR50_{\_780\text{-}850(0\ deg)}$ and $IR50_{\_780\text{-}850(40\ deg)}$ was small, and thus the spectral curve in the region of 780 nm to 850 nm was unlikely to shift even at a high incident angle.

From a comparison between Examples 5-1 and 5-4, it was understood that the optical filter in Example 5-1 including the dielectric multilayer film (the antireflection layer) in Example 4-1 having a transmission band wider than that in Example 4-2 had a transmissivity for a near-infrared light of 840 nm to 870 nm better than that in Example 5-4.

From a comparison among Examples 5-5, 5-6, and 5-8, it was understood that by including the dielectric multilayer film (the protective layer) having a light shielding property for the near-infrared light of 880 nm or more, a change in average transmittance for the near-infrared light of 840 nm to 870 nm was small even at a high incident angle while maintaining the light shielding property for a near-infrared light of 950 nm to 1200 nm.

In the optical filters in Examples 5-2, 5-3, 5-7, and 5-9 in which the absolute value of the difference between the wavelength IR50 (R) and the wavelength IR50 (L) was smaller than 110 nm, the average transmittance $T_{840\text{-}870\ (40\ deg)AVE}$ was small, and thus the transmissivity for the near-infrared light of 840 nm to 870 nm was low at a high incident angle.

In the optical filter in Example 5-9 including one NIR dye having a maximum absorption wavelength of 700 nm to 800 nm and one NIR dye having a maximum absorption wavelength exceeding 800 nm, the average transmittance $T_{840\text{-}870\ (0\ deg)AVE}$ and the average transmittance $T_{840\text{-}870\ (40\ deg)AVE}$ were small, and thus the transmissivity for the near-infrared light of 840 nm to 870 nm was generally low; and the average transmittance $T_{700\text{-}800(0\ deg)AVE}$ was small, and thus the shielding property for the near-infrared light of 700 nm to 800 nm was low.

In the optical filter in Example 5-10 including two NIR dyes having a maximum absorption wavelength of 700 nm to 800 nm, the average transmittance $T_{700\text{-}800\ (0\ deg)AVE}$ was small, and thus the shielding property for the near-infrared light having a wavelength of 700 nm to 800 nm was low.

In the optical filter in Example 5-11 including three NIR dyes having a maximum absorption wavelength of 700 nm to 800 nm and one NIR dye having a maximum absorption wavelength exceeding 900 nm, the average transmittance $T_{440\text{-}600\ (0\ deg)AVE}$ was small, and thus the transmissivity for a light in the visible light region was low; and the average transmittance $T_{840\text{-}870\ (0\ deg)AVE}$ and the average transmittance $T_{840\text{-}870\ (40\ deg)AVE}$ were small, and thus the transmissivity for the near-infrared light having a wavelength of 840 nm to 870 nm was generally low.

Although the present invention has been described in detail with reference to specific embodiments, it is apparent to those skilled in the art that various changes and modifications can be made without departing from the spirit and scope of the present invention. The present application is based on a Japanese Patent Application (Japanese Patent Application No. 2021-212958) filed on Dec. 27, 2021, and the contents thereof are incorporated herein by reference.

INDUSTRIAL APPLICABILITY

The optical filter of the present invention has an excellent transmissivity for a visible light and a specific near-infrared light, has a shielding property for other near-infrared light, and has a good near-infrared light shielding property in which a decrease in shielding property for a near-infrared light at a high incident angle can be prevented. The optical filter is useful for applications of information acquisition devices such as cameras and sensors for transport machines, for which a high performance is achieved in recent years.

REFERENCE SIGNS LIST

1A, 1B, 1C, and 1D: optical filter
10: substrate
11: support
12: resin film
20A, 20B, and 20C: dielectric multilayer film

What is claimed is:

1. An optical filter comprising:

a substrate; and a dielectric multilayer film (A) laid on or above at least one main surface of the substrate as an outermost layer, the dielectric multilayer film (A) being configured to reflect a light in a wavelength region of 900 nm or more, wherein the substrate comprises a resin film comprising a resin and a dye (I) having a maximum absorption wavelength of 700 nm to 800 nm in the resin, the optical filter transmits a visible light and a light in at least a partial wavelength region of 750 nm to 1000 nm, and the optical filter satisfies all of the following spectral characteristics (i-1) to (i-9):

(i-1) when a side of the dielectric multilayer film (A) is set as an incident direction, in a spectral reflectance curve at an incident angle of 5 degrees, a wavelength IR50(R) at which a reflectance is 50% is in a range of 900 nm to 970 nm;

(i-2) in a spectral transmittance curve at an incident angle of 0 degrees, a wavelength IR50(L) at which a transmittance is 50% is in a range of 780 nm to 850 nm;

(i-3) an absolute value of a difference between the wavelength IR50(R) and the wavelength IR50(L) is 110 nm or more;

(i-4) in the spectral transmittance curve at the incident angle of 0 degrees, an average transmittance $T_{440\text{-}600\ (0\ deg)AVE}$ in a wavelength of 440 nm to 600 nm is 86% or more;

(i-5) in the spectral transmittance curve at the incident angle of 0 degrees, an average transmittance $T_{700\text{-}800\ (0\ deg)AVE}$ in a wavelength of 700 nm to 800 nm is 5% or less;

(i-6) in the spectral transmittance curve at the incident angle of 0 degrees, an average transmittance $T_{840\text{-}870\ (0\ deg)AVE}$ in a wavelength of 840 nm to 870 nm is 88% or more;

(i-7) in the spectral transmittance curve at the incident angle of 0 degrees, an average transmittance $T_{950\text{-}1200\ (0\ deg)AVE}$ in a wavelength of 950 nm to 1200 nm is 5% or less;

(i-8) in a spectral transmittance curve at an incident angle of 40 degrees, an average transmittance $T_{840\text{-}870\ (40\ deg)AVE}$ in a wavelength of 840 nm to 870 nm is 70% or more; and (i-9) an absolute value of a difference between $IR50_{\_780\text{-}850(0\ deg)}$ and $IR50_{\_780\text{-}850(40\ deg)}$ is 8 nm or less, where the $IR50_{\_780\text{-}850(0\ deg)}$ is a wavelength at which a transmittance is 50% in a wavelength range of 780 nm to 850 nm in the spectral transmittance curve at the incident angle of 0 degrees, and the $IR50_{\_780\text{-}850(40\ deg)}$ is a wavelength at which a transmittance is 50% in a wavelength range of 780 nm to 850 nm in the spectral transmittance curve at the incident angle of 40 degrees.

2. The optical filter according to claim 1, wherein the optical filter further satisfies the following spectral characteristic (i-16):

(i-16) an absolute value of a difference between the average transmittance $T_{840\text{-}870\ (0\ deg)AVE}$ in the wavelength range of 840 nm to 870 nm in the spectral transmittance curve at the incident angle of 0 degrees and the average transmittance $T_{840\text{-}870\ (40\ deg)AVE}$ in the wavelength range of 840 nm to 870 nm in the spectral transmittance curve at the incident angle of 40 degrees is 25% or less.

3. The optical filter according to claim 1, wherein the optical filter further satisfies the following spectral characteristic (i-17):

(i-17) an absolute value of a difference between the average transmittance $T_{440\text{-}600\ (0\ deg)AVE}$ in the wavelength range of 440 nm to 600 nm in the spectral transmittance curve at the incident angle of 0 degrees and an average transmittance $T_{440\text{-}600\ (40\ deg)AVE}$ in a wavelength range of 440 nm to 600 nm in the spectral transmittance curve at the incident angle of 40 degrees is 5% or less.

4. The optical filter according to claim 1, wherein the optical filter further satisfies the following spectral characteristic (i-18):

(i-18) when the side of the dielectric multilayer film (A) is set as the incident direction, in the spectral reflectance curve at the incident angle of 5 degrees, an average reflectance $R_{700\text{-}800(5\ deg)AVE}$ in a wavelength of 700 nm to 800 nm is 0% to 50%.

5. The optical filter according to claim 1, wherein the substrate further comprises a support, the resin film, and a dielectric multilayer film (B) disposed between the support and the resin film, and the dielectric multilayer film (B) satisfies all of the following spectral characteristics (iiB-1) and (iiB-2) when the dielectric multilayer film (B) is formed on a transparent glass substrate:

(iiB-1) in a spectral transmittance curve at an incident angle of 0 degrees, an average transmittance $T_{440\text{-}600(0\ deg)AVE}$ in a wavelength range of 440 nm to 600 nm is 85% or more; and (iiB-2) in the spectral transmittance curve at the incident angle of 0 degrees, an average transmittance $T_{880\text{-}1200\ (0\ deg)AVE}$ in a wavelength range of 880 nm to 1200 nm is 85% or less.

6. The optical filter according to claim 1, wherein the dielectric multilayer film (A) satisfies all of the following spectral characteristics (iiA-1) to (iiA-6) when the dielectric multilayer film (A) is formed on a transparent glass substrate:

(iiA-1) in a spectral transmittance curve at an incident angle of 0 degrees, an average transmittance $T_{440\text{-}600\ (0\ deg)AVE}$ in a wavelength range of 440 nm to 600 nm is 90% or more;

(iiA-2) in the spectral transmittance curve at the incident angle of 0 degrees, an average transmittance $T_{840\text{-}870\ (0\ deg)AVE}$ in a wavelength range of 840 nm to 870 nm is 90% or more;

(iiA-3) in a spectral transmittance curve in a wavelength range of 440 nm to 600 nm, an absolute value of a difference between the average transmittance $T_{440\text{-}600\ (0\ deg)AVE}$ at the incident angle of 0 degrees and an average transmittance $T_{440\text{-}600\ (40\ deg)AVE}$ at an incident angle of 40 degrees is 10% or less;

(iiA-4) in a spectral transmittance curve in a wavelength range of 840 nm to 870 nm, an absolute value of a difference between the average transmittance $T_{840\text{-}870\ (0\ deg)AVE}$ at the incident angle of 0 degrees and an average transmittance $T_{840\text{-}870\ (40\ deg)AVE}$ at an incident angle of 40 degrees is 2% or less;

(iiA-5) in the spectral transmittance curve at the incident angle of 0 degrees, a wavelength IR50(L) at which a transmittance is 50% is in a range of 900 nm to 960 nm; and (iiA-6) in the spectral transmittance curve at the incident angle of 0 degrees, an average transmittance $T_{950\text{-}1200\ (0\ deg)AVE}$ in a wavelength range of 950 nm to 1200 nm is 5% or less.

7. The optical filter according to claim 1, wherein the support is a transparent glass.

8. The optical filter according to claim 1, wherein the resin film has a thickness of 3 μm or less.

9. The optical filter according to claim 1, wherein the resin in the resin film has a glass transition temperature of 200° C. or higher, and a content of the dye (I) in the resin film is 15 mass % or less.

10. The optical filter according to claim 1, wherein the resin film satisfies all of the following spectral characteristics (iii-1) to (iii-5):

(iii-1) an average internal transmittance $T_{440\text{-}600\ AVE}$ in a spectral transmittance curve at a wavelength of 440 nm to 600 nm is 85% or more;

(iii-2) a wavelength IR50 at which an internal transmittance is 50% is in a range of 620 nm to 680 nm;

(iii-3) an average internal transmittance $T_{700\text{-}800\ AVE}$ in a spectral transmittance curve at a wavelength of 700 nm to 800 nm is 5% or less;

(iii-4) a wavelength IR50 at which an internal transmittance is 50% is in a range of 780 nm to 850 nm; and (iii-5) an average internal transmittance $T_{840\text{-}870\ AVE}$ in a spectral transmittance curve at a wavelength of 840 nm to 870 nm is 90% or more.

11. The optical filter according to claim 1, wherein the dye (I) comprises:

at least one selected from compounds (IA) having a maximum absorption wavelength in a wavelength region of 700 nm or more and less than 730 nm in the resin;

at least one selected from compounds (IB) having a maximum absorption wavelength in a wavelength region of 730 nm or more and less than 760 nm in the resin; and at least one selected from compounds (IC) having a maximum absorption wavelength in a wavelength region of 760 nm or more and less than 780 nm in the resin.

12. An imaging device comprising:

the optical filter according to claim 1.

* * * * *